United States Patent
Wu

(10) Patent No.: US 12,487,413 B2
(45) Date of Patent: Dec. 2, 2025

(54) CORE POLARITY INVARIANT STRUCTURED MULTICORE FIBER OPTIC CABLING SYSTEM

(71) Applicant: CORNING RESEARCH & DEVELOPMENT CORPORATION, Corning, NY (US)

(72) Inventor: Qi Wu, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 260 days.

(21) Appl. No.: 18/469,007

(22) Filed: Sep. 18, 2023

(65) Prior Publication Data

US 2024/0142721 A1    May 2, 2024

Related U.S. Application Data

(60) Provisional application No. 63/420,217, filed on Oct. 28, 2022.

(51) Int. Cl.
  G02B 6/38    (2006.01)
  G02B 6/02    (2006.01)
  G02B 6/44    (2006.01)

(52) U.S. Cl.
  CPC ....... *G02B 6/3885* (2013.01); *G02B 6/02042* (2013.01); *G02B 6/3812* (2013.01);
  (Continued)

(58) Field of Classification Search
  CPC .. G02B 6/4472; G02B 6/3831; G02B 6/3812; G02B 6/44528
  See application file for complete search history.

(56) References Cited

U.S. PATENT DOCUMENTS 8,725,001 B2 *  5/2014  Fini ....................... H04J 14/052
                                                             398/145
9,151,923 B2   10/2015  Nielson et al.
                (Continued)

FOREIGN PATENT DOCUMENTS

WO   2021/131977 A1   7/2021

OTHER PUBLICATIONS

"Polarity method selections in MTP / MPO fibre optics", Retrieved from: https://wbnetworks.com.au/blog/Polarity-method-selection-MTP-MPO, 2020, 8 pages.
(Continued)

*Primary Examiner* — Sung H Pak
(74) *Attorney, Agent, or Firm* — Adam R. Weeks

(57) ABSTRACT

Structured multicore fiber optic cabling systems, network components, and methods of making same. The cabling system includes a multicore fiber optic cable assembly and a plurality of network components. Each cable assembly includes first and second cable connectors and a plurality of multicore optical fibers. One half of the plurality of multicore optical fibers have a first draw direction, and the other half of the plurality of multicore optical fibers have a second draw direction opposite the first draw direction. The first and second cable connectors are configured so that their end faces define a connector core pattern having mirror-image symmetry. Each network component of the cabling system includes a port connector having a port connector interface that has the connector core pattern. Core polarity is preserved between a first network component and a second network component of the plurality of network components connected by the cable assembly.

20 Claims, 34 Drawing Sheets

(52) U.S. Cl.
CPC ......... *G02B 6/3825* (2013.01); *G02B 6/3831* (2013.01); *G02B 6/44528* (2023.05); *G02B 6/4472* (2013.01)

(56) References Cited

U.S. PATENT DOCUMENTS 9,453,979 B2 9/2016 Nagashima et al.
2023/0017442 A1 1/2023 Takenaga et al.

OTHER PUBLICATIONS

Kengo Watanabe et.al.; "MPO Type 8-Multicore Fiber Connector With Physical Contact Connection ," J. Lightw. Technol., vol. 34, 2016, 7 pages.

Kotaro Saito et al.; "Multi-core fiber connector using V-groove ferrule," Optical Fiber Technology, 23, 2015, pp. 24-29.

Ryo Nagase, "Optical Connectivities for Multicore Fiber," OFC 2020 TH3I.1, 3 pages.

Ryuichi Sugizaki et.al. "Multicore fiber technologies toward practical use," Proceedings of SPIE—The International Society for Optical Engineering, v 11308, 2020, 8 pages.

Takashi Matsui, et al., "Design of 125 um cladding multi-core fiber with full-band compatibility to conventional single-mode fiber," European Conference on Optical Communication (ECOC) 2015, We1.4.5, (2015), 3 pages.

Tetsu Morishima et al; "Simple-structure low-loss multi-core fiber LC connector using an align-by-contact method," Optics Express, vol. 29, 9157, 2021, 3 pages.

Tetsu Morishima et.al.; "MCF-enabled Ultra-High-Density 256-core MT Connector and 96-core Physical-Contact MPO Connector," OFC 2017, 3 pages.

Yusuke Sasaki, et.al.; "Optical Fiber Cable Employing 200 μm-Coated Multicore Fibers for High Density Wiring in Datacom," OFC 2021, Tu6B.2, 3 pages.

\* cited by examiner

US 12,487,413 B2

CORE POLARITY INVARIANT STRUCTURED MULTICORE FIBER OPTIC CABLING SYSTEM

PRIORITY APPLICATION

This application claims the benefit of priority of U.S. Provisional Application No. 63/420,217, filed on Oct. 28, 2022, the content of which is relied upon and incorporated herein by reference in its entirety.

TECHNICAL FIELD

This disclosure relates generally to fiber optic connectors and cable assemblies, and more particularly, to structured multicore fiber optic cabling systems that provide direction-independent connectivity, and methods of making structured multicore fiber optic cabling systems that provide direction-independent connectivity.

BACKGROUND

Optical fibers are useful in a wide variety of applications, the most common being as part of the physical layer of a communication protocol through which network nodes communicate over a data network. Benefits of optical fibers include wide bandwidth and low noise operation. Continued growth of the Internet has resulted in a corresponding increase in demand for network capacity. This demand for network capacity has, in turn, generated a need for increased bandwidth between network nodes.

Multicore optical fibers are optical fibers in which multiple cores are contained within a common cladding. Multicore optical fibers function essentially as a bundle of single-core fibers, thereby providing increased capacity as compared to individual single-core optical fibers. The use of multicore optical fibers has yet to be widely adopted for long haul applications due to advances in technology that have enabled increased transmission rates over existing single-core optical fibers, such as dense wavelength division multiplexing and coherent optical communication techniques. Nevertheless, with the rapid growth of hyperscale data centers, and the maturing of dense wavelength division multiplexing and coherent optical communication technologies, the use of multicore fiber optic cables is expected to increase.

Data center campuses provide computing spaces for housing computer systems and associated network components. These computing spaces are typically spread across multiple buildings located on the campus. To facilitate connections between these computing spaces, conduits or other cable ducts configured to carry fiber optic cables are typically installed between the computing spaces when the data center campus is constructed. The distances between computing spaces within a data center campus are typically less than two kilometers, and massive numbers of optical fibers are used to interconnect these spaces both within each campus as well as between regional campuses. Preexisting cable ducts between computer spaces have a limited amount of space that is difficult to expand. Accordingly, as the need for higher fiber counts continues to increase, multicore optical fibers have the potential to provide a solution to this limited amount of cable duct space.

FIGS. 1A and 1B depict exemplary multicore optical fibers 10 each representing a separate fiber span. Each multicore optical fiber 10 includes a cladding 12, a plurality of cores 14a-14d contained within the cladding 12, a front end face 16, a back end face 18, and a fiber draw direction extending from the front end face 16 to the back end face 18, as indicated diagrammatically by single-headed arrows 20. The cores 14a-14d are spaced symmetrically around a center axis of the cladding 12, and each end face 16, 18 includes a marker 22 that identifies a reference core (e.g., core 14a) of the multicore optical fiber 10. In FIG. 1A, the multicore optical fibers 10 are oriented so that the fiber draw direction of each fiber span is in the same direction. In FIG. 1B, the multicore optical fibers 10 are oriented so that their fiber draw directions are in opposite directions.

In order to maintain a consistent core polarity between connected fiber spans, the multicore optical fibers 10 must be oriented so that they have the same fiber draw direction. In the depicted case, core polarity is maintained when the front end face 16 of one multicore optical fiber 10 interfaces with the back end face 18 of another multicore optical fiber. As shown by FIG. 1A, matching fiber draw directions enable the end faces 16, 18 to be coupled such that each core 14a-14d on the front end face 16 is aligned with a correspondingly positioned core 14a-14d on the back end face 18. Core polarity can thereby be maintained across multiple fiber spans that have matching fiber draw directions.

In contrast, when the multicore optical fibers 10 of two spans are oriented so that they have opposing fiber draw directions as in FIG. 1B, two like end faces (e.g., two back end faces 18) need to be interfaced. With the exemplary multicore optical fibers 10 of FIGS. 1A and 1B, fiber spans having opposite fiber draw directions can at best be connected such that the optical fibers are cross-connected. This cross-connection results in an optical beam entering a specific core (e.g., core 14a) of one span being emitted from a different core (e.g., core 14b) of the other fiber span.

FIGS. 2A and 2B depict another variation of the exemplary multicore optical fibers 10 in which the cores 14a-14d are arranged in an asymmetrical pattern. Specifically, one core (e.g., core 14a) is radially offset relative to the other cores (e.g., cores 14b-14c). This asymmetrical arrangement enables individual cores 14a-14d to be identified without the need for a marker 22. As with the fiber spans depicted by FIG. 1A, the multicore optical fibers 10 depicted by FIG. 2A are oriented so that they have the same fiber draw direction. This enables the end faces 16, 18 to be operatively coupled such that each core 14a-14d on the front end face 16 is aligned with a corresponding core 14a-14d on the back end face 18. Core polarity can thereby be maintained across the fiber spans of FIG. 2A. In contrast, the multicore optical fibers 10 depicted by FIG. 2B are oriented so that they have opposing fiber draw directions. This prevents the end faces 16, 18 from being coupled in a way that maintains either core polarity or connectivity across the fiber spans of FIG. 2B.

As can be seen from FIGS. 1A-2B, in order to distinguish each core in a multicore optical fiber, radial symmetry of the core pattern must be broken. Radial symmetry may be broken by introducing a marker 22 in parallel with the cores 14a-14d, as illustrated in FIGS. 1A and 1B, or by positioning at least one of the cores 14a-14d so that the core 14a-14d is in an "off position" (e.g., a radially non-symmetric position), as illustrated by FIGS. 2A and 2B. The marker 22 or off position core 14a may be observed in any cross section of the multicore optical fiber 10. By designating the off position/marked core as a reference core, the rest of the cores can be identified through a naming convention. In other words, the core polarity of a multicore optical fiber may be defined by including at least one core with a mark-based or position-based asymmetry. A core polarity defined in this way is maintained regardless of the observer's viewpoint. Asymmetric core patterns look different at the front and back end faces 16, 18 of the multicore optical fiber 10 because each core pattern as viewed at one end face is a mirror-image of the core pattern as viewed at the other end face. The resulting directional nature of multicore optical fiber connectivity is both profoundly different from a single core optical fiber and a source of connectivity issues.

Duplex patch cord cable assemblies are widely used in data center networks as part of a structured cabling system for connecting network nodes using single core optical fibers. The term "structured cabling system" is generally used to refer to cabling systems that include cable assemblies and other network components having standardized pre-terminated connection interfaces. For example, duplex transceivers are typically connected via duplex patch cords to cassettes or harnesses, which may then be connected to a trunk cable through a Multi-fiber Push On (MPO) connector. Because the receive port of each transceiver is connected to the transmission port of the other receiver, an optical fiber polarity switch typically occurs at some point between the transceivers being connected.

TIA-568 is a technical standard issued by the Telecommunications Industry Association (TIA), and defines three methods (methods A, B, and C) for connecting transceivers using structured cabling. Method-A uses key-up to key-down straight-through MPO terminated trunk cables in which a fiber polarity switch occurs in the duplex patch cords on one side. Methods B and C use what is referred to as A-to-B type or "straight-through" duplex cables, with polarity switching occurring at the MPO trunk cables. Method-B uses key-up to key-up type B symmetric MPO terminated trunk cables, and is widely used due to its simplicity. Method C is less common, and uses pair-wise flipped type-C trunk cables. The multitude of options in single core fiber based structured cabling leads to significant complexity when migrating to multicore fiber. With multicore fiber, in addition to managing the optical fiber polarity, one must also trace the path of each core in each multicore optical fiber. The use of multicore optical fibers therefore adds a new dimension of complexity to connections between nodes in fiber optic networks.

FIGS. 3A-3C depict exemplary fiber optic cables 24 ("cables 24") each including a plurality of multicore optical fibers 10 (e.g., two multicore optical fibers 10) arranged in a configuration suitable for use in an A-to-B type duplex cable assembly. Each multicore optical fiber 10 is configured as described above for FIGS. 1A-2B, and each cable 24 represents a separate fiber span 26, 28. Because the cables 24 in FIG. 3A have the same draw directions, both the multicore optical fibers 10 of each span, and the cores 14a-14b of each multicore optical fiber 10, can be aligned to maintain core polarity.

FIG. 3B depicts the effects of a change in the draw direction of the cable 24 of lower fiber span 28 so that the draw directions of the cables 24 are in opposite directions. As can be seen, the multicore optical fibers 10 of the upper fiber span 26 are no longer aligned with the corresponding multicore optical fibers 10 of the lower fiber span 28. That is, multicore optical fiber A of the upper fiber span 26 is aligned with multicore optical fiber B of the lower fiber span 28, and multicore optical fiber B of the upper fiber span 26 is aligned with multicore optical fiber A of the lower fiber span 28. In addition, the cores within each multicore optical fiber 10 do not have matching core polarities. Specifically, core 1 of each upper multicore optical fiber 10 is aligned with core 2 of its respective lower multicore optical fiber 10, core 2 of each upper multicore optical fiber 10 is aligned with core 1 of its respective lower multicore optical fiber 10, core 3 of each upper multicore optical fiber 10 is aligned with core 4 of its respective lower multicore optical fiber 10, and core 4 of each upper multicore optical fiber 10 is aligned with core 3 of its respective lower multicore optical fiber 10.

FIG. 3C depicts the effects rotating the cable 24 of lower fiber span 28 180 degrees about its longitudinal axis in an attempt to correct the polarity of the multicore optical fibers 10. Although rotating the cable 24 of lower fiber span 28 brings each multicore optical fiber 10 into alignment with its respective multicore optical fiber 10 in the upper fiber span 26 (i.e., A→A and B→B) the polarities of the cores 14a-14d remain mismatched. Specifically, core 1 of each upper multicore optical fiber 10 is aligned with core 3 of its respective lower multicore optical fiber 10, core 2 of each upper multicore optical fiber 10 is aligned core 4 of its respective lower multicore optical fiber 10, core 3 of each upper multicore optical fiber 10 is aligned with core 1 of its respective lower multicore optical fiber 10, and core 4 of each upper multicore optical fiber 10 is aligned with core 2 of its respective lower multicore optical fiber 10. In any case, for cables that include angled physical contact connectors to minimize back-reflection, rotation would not be an option even if it corrected the core polarity. Thus, it should be apparent that it is not possible to maintain core polarity across spans of conventional fiber optic cables 24 having opposite draw directions which include multicore optical fibers 10.

In order for an optical beam coupled into a specific core at one end of a multicore optic fiber to emerge from the corresponding core at the opposite end of a fiber optic link including multiple fiber spans, core polarity must be maintained across each fiber span of the fiber optic link. This leads to a requirement that multicore fiber spans in a multi-span fiber optic link have the same fiber draw direction. This consistent fiber draw direction requirement means that multicore fiber spans with opposite fiber draw directions cannot be connected to provide a multi-span fiber optic link. In cases of symmetrically positioned multi-core arrangements, this leads to cross-connected signals in which optical beams coupled to one core emerge from a different core at the other end of the multi-span fiber optic link. In cases of asymmetrically positioned multicore arrangements, connecting the same end of each multicore optical fiber to each other leads to both core polarity mismatches and an inability to couple the optical beam across the fiber span for at least some of the cores.

When cable assemblies including multicore fibers are deployed as part of a structured cabling system in hyperscale data centers, the difficulties in managing core polarities of thousands of multicore optical fibers become intractable. Maintaining all multicore optical fiber spans so that they are directionally aligned is impractical at best, as it entails both tedious tracking of the cable ends and a requirement that network components have two types of multicore connector interfaces so that they are compatible with both the front and back ends of the multicore optical fibers.

Single core cable assemblies in data centers are often pre-terminated with connectors in a factory to improve installation efficiency. These pre-terminated optical cables may be tested and used individually or pre-packaged into cable bundles including multiple pre-terminated optical cables. Depending on the application, cable assemblies in pre-engineered cable bundles may have different lengths to facilitate connections to different racks, shelves, and/or ports in a row of equipment racks. At the data center, the installer merely needs to unpack and route the cable sub-assemblies/bundles, snap in connectors, install patch cords to end equipment, etc. Thus, pre-terminated cable assemblies and bundles can save significant amounts of time and effort as compared to fabricating separate cable assemblies on-site. However, the directionality of multicore optical fibers creates complications with pre-terminated cable assemblies and bundles. For example, if even one fiber optic cable in a cable bundle is running in the wrong direction, or an arrangement of network equipment in an equipment rack changes, the cable assembly or bundle in question may need to be re-run or replaced at significant cost in time and money.

Although the optical fiber count in data centers can be reduced by replacing standard single core optical fiber with multicore optical fiber, large numbers of optical fibers are still needed. For example, replacing an ultra-high count fiber optic cable having 6,912 single mode optical fibers with multicore optical fibers having four cores each would still require a fiber optic cable with 1,728 multicore optical fibers. Moreover, because fusion splicing of multicore optical fibers in the field is difficult, pre-terminated structured cabling systems would provide an even more significant advantage with multicore optical fiber than they do with single core optical fiber. Accordingly, in order to take advantage of the increased bandwidth provided by multicore optical fibers, structured multicore fiber optic cabling systems will need to manage the direction dependent connectivity requirements of multicore optical fibers to maintain core polarity between network nodes. Thus, there is a need in the fiber optic industry for improved structured multicore fiber optic cabling systems, and methods of making structured multicore fiber optic cabling systems.

SUMMARY

In an aspect of the disclosure, a structured multicore fiber optic cabling system is disclosed. The structured multicore fiber optic cabling system includes one or more multicore fiber optic cable assemblies and a plurality of network components. Each multicore fiber optic cable assembly includes a first cable connector including a first cable connector interface, a second cable connector including a second cable connector interface, and a first plurality of multicore optical fibers. Each of the multicore optical fibers includes a first end face having a first end face core pattern and a second end face having a second end face core pattern that is a mirror image of the first end face core pattern. The first plurality of multicore optical fibers is configured so that a first half thereof has a first draw direction, and a second half thereof has a second draw direction opposite the first draw direction. The first cable connector is configured so that the first end face of each multicore optical fiber having the first draw direction and the second end face of each multicore optical fiber having the second draw direction is placed in the first cable connector interface to define a first connector core pattern having a first mirror-image symmetry. The second cable connector is configured so that the first end face of each multicore optical fiber having the second draw direction and the second end face of each multicore optical fiber having the first draw direction is placed in the second cable connector interface to define the first connector core pattern. Each network component of the plurality of network components includes a port connector having a port connector interface. The port connector interface includes a plurality end faces with a first half thereof having the first end face core pattern and a second half thereof having the second end face core pattern, and each end face of the plurality of end faces is placed in the port connector interface to define the first connector core pattern. The core polarity is preserved between a first port connector of a first network component of the plurality of network components and a second port connector of a second network component of the plurality of network components when the first cable connector of a first multicore fiber optic cable assembly of the one or more multicore fiber optic cable assemblies is operatively coupled to the first port connector, and the second cable connector of the first multicore fiber optic cable assembly is operatively coupled to the second port connector. The core polarity is also preserved between the first port connector of the first network component and the second port connector of the second network component when the first cable connector of the first multicore fiber optic cable assembly is operatively coupled to the second port connector, and the second cable connector of the first multicore fiber optic cable assembly is operatively coupled to the first port connector.

In an embodiment of the disclosed structured multicore fiber optic cabling system, the first cable connector may include a first cable alignment key having a first placement relative to the first connector core pattern of the first cable connector, and the second cable connector may include a second cable alignment key having the first placement relative to the first connector core pattern of the second cable connector.

In another embodiment of the disclosed structured multicore fiber optic cabling system, the first port connector may include a first port alignment key having a second placement relative to the first connector core pattern of the first port connector, the second port connector may include a second port alignment key having the second placement relative to the first connector core pattern of the second port connector, and the second placement relative to the first connector core pattern may be opposite the first placement relative to the first connector core pattern. Each cable connector and each port connector may include a key-axis that lies in a plane which bisects the respective connector and is aligned with the cable alignment key or port alignment key of the respective connector. In each cable connector and port connector interface, the first and second end faces of the first plurality of multicore optical fibers may be aligned in one or more arrays that are orthogonal to the key-axis of the respective connector. In this embodiment, the core polarity may be preserved between the first port connector of the first network component and the second port connector of the second network component when each of the first and second cable alignment key orientations is opposite that of the first or second port alignment key orientation of the respective first or second port connector to which the first or second cable connector is operatively coupled.

In another embodiment of the disclosed structured multicore fiber optic cabling system, the first port connector may include the first port alignment key having the first placement relative to the first connector core pattern of the first port connector, and the second port connector may include the second port alignment key having the first placement relative to the first connector core pattern of the second port connector. Each cable connector and each port connector may include the key-axis that lies in the plane which bisects the respective connector and is aligned with the cable alignment key or the port alignment key of the respective connector. In each cable connector interface and each port connector interface, the first and second end faces of the first plurality of multicore optical fibers may be aligned in one or more arrays that are parallel to the key-axis of the respective connector. In this embodiment, the core polarity may be preserved between the first port connector of the first network component and the second port connector of the second network component when each of first and second cable alignment key orientations is the same as the first or second port alignment key orientation to which the respective first and second cable connector is operatively coupled.

In another embodiment of the disclosed structured multicore fiber optic cabling system, the first and second end faces of the first plurality of multicore optical fibers may be aligned in one array that is parallel to the key-axis of the respective connector, and the first mirror-image symmetry of the first connector core pattern of each connector may be about an axis of symmetry that is orthogonal to the key-axis.

In another embodiment of the disclosed structured multicore fiber optic cabling system, the first and second end faces of the first plurality of multicore optical fibers may be aligned in an even number of two or more arrays that are parallel to the key-axis of the respective connector, and the first mirror-image symmetry of the first connector core pattern of each connector may be about an axis of symmetry that is parallel to the key-axis.

In another embodiment of the disclosed structured multicore fiber optic cabling system, the first and second end faces of the first plurality of multicore optical fibers may be arranged in at least two linear arrays, and each linear array of end faces may include 4, 8, 12, or 16 end faces.

In another embodiment of the disclosed structured multicore fiber optic cabling system, the first port connector of each of the first and second network components may be a trunk connector, and at least one of the first and second network components may be one of a plurality of breakout modules. Each breakout module of the plurality of breakout modules may include the trunk connector having the first connector core pattern, a second plurality of multicore optical fibers each including the first end face and the second end face, and a plurality of branch connectors. The second plurality of multicore optical fibers may be configured so that a first half thereof has the first draw direction and a second half thereof has the second draw direction. Each branch connector may include a branch connector interface and be operatively coupled to the trunk connector by a respective multicore optical fiber from each of the first and second halves of the second plurality of multicore optical fibers. Each branch connector may be configured so that the second end face of the multicore optical fiber having the first draw direction and the first end face of the multicore optical fiber having the second draw direction is placed in the branch connector interface to define a second connector core pattern having a second mirror-image symmetry.

In another embodiment of the disclosed structured multicore fiber optic cabling system, the plurality of breakout modules may include a third breakout module and a fourth breakout module, the one or more multicore fiber optic cable assemblies may include a second multicore fiber optic cable assembly, and the structured multicore fiber optic cabling system may further include a plurality of multicore duplex patch cords. Each multicore duplex patch cord may include first and second multicore optical fibers, and first and second patch cord connectors. The first multicore optical fiber may include the first end face having the first end face core pattern and the second end face having the second end face core pattern. The second multicore optical fiber may include the first end face having the first end face core pattern and the second end face having the second end face core pattern. The first patch cord connector may define a first end of the multicore duplex patch cord and include a first patch cord connector interface. The first end face of the first multicore optical fiber and the second end face of the second multicore optical fiber may be placed in the first patch cord connector interface to define the second connector core pattern. The second patch cord connector may define a second end of the multicore duplex patch cord and include a second patch cord connector interface. The second end face of the first multicore optical fiber and the first end face of the second multicore optical fiber may be placed in the first patch cord connector interface to define the second connector core pattern. The trunk connector of the third network component may be operatively coupled to the trunk connector of the fourth network component by the second multicore fiber optic cable assembly, and each of the branch connectors of the second network component may be operatively coupled to a respective branch connector of the third network component to define a cross-connection between the first network component and the fourth network component.

In another embodiment of the disclosed structured multicore fiber optic cabling system, the system may further include a third network component including one or more transceivers each having a high-density transceiver interface, and one or more multicore duplex patch cords each including first and second multicore optical fibers and first and second patch cord connectors. The first multicore optical fiber may include the first end face having the first end face core pattern and the second end face having the second end face core pattern. The second multicore optical fiber may include the first end face having the first end face core pattern and the second end face having the second end face core pattern. The first patch cord connector may define a first end of the multicore duplex patch cord, and may include a patch cord alignment key defining a key-axis and a first patch cord connector interface having a cross-axis orthogonal to the key-axis. The second patch cord connector may define a second end of the multicore duplex patch cord, and may include the patch cord alignment key defining the key-axis and a second patch cord connector interface having the cross-axis orthogonal to the key-axis. Each of the first and second end face core patterns may include a plurality of cores arranged in a linear array of cores. The first end face of the first multicore optical fiber and the second end face of the second multicore optical fiber may be placed in the first patch cord connector interface so that each linear array of cores is aligned with the cross axis of the first patch cord connector and to define the second connector core pattern having the second mirror-image symmetry. The second end face of the first multicore optical fiber and the first end face of the second multicore optical fiber may be placed in the second patch cord connector interface so that each linear array of cores is aligned with the cross axis of the second patch cord connector and to define the second connector core pattern having the second mirror-image symmetry. The second network component may be one of the plurality of breakout modules. Each branch connector of the second network component may include a branch alignment key defining the key-axis of the branch connector, and the branch connector interface may have the cross axis orthogonal to the key-axis and the second connector core pattern. The high-density transceiver interface may include a transceiver connector having a transceiver alignment key defining the key-axis of the transceiver connector, and a transceiver connector interface having the cross-axis orthogonal to the key-axis and the second connector core pattern. Each transceiver connector may be operatively coupled to a respective branch connector by a respective multicore duplex patch cord of the one or more multicore duplex patch cords with the same key orientation.

In another embodiment of the disclosed structured multicore fiber optic cabling system, the first cable connector may include a first cable alignment key having a first placement relative to the first connector core pattern of the first cable connector, and the second cable connector may include a second cable alignment key having a second placement relative to the first connector core pattern of the second cable connector that is opposite the first placement relative to the first connector core pattern.

In another embodiment of the disclosed structured multicore fiber optic cabling system, the first port connector may include a first port alignment key having the second placement relative to the first connector core pattern of the first port connector, and the second port connector may include a second port alignment key having the first placement relative to the first connector core pattern of the second port connector. In this embodiment, the core polarity may be preserved between the first port connector of the first network component and the second port connector of the second network component when each of the first and second cable alignment key orientations is the opposite of the first or second port alignment key orientation to which the respective first and second cable connector is operatively coupled.

In another aspect of the disclosure, a breakout module for a structured multicore fiber optic cabling system is disclosed. The breakout module includes a plurality of multicore optical fibers, a trunk connector, and a plurality of branch connectors. Each of the multicore optical fibers includes a first end face having a first end face core pattern and a second end face having a second end face core pattern that is a mirror-image of the first end face core pattern. The plurality of multicore optical fibers is configured so that a first half thereof has a first draw direction, and a second half thereof has a second draw direction opposite the first draw direction. The trunk connector includes a trunk connector interface configured so that the first end face of each multicore optical fiber having the first draw direction and the second end face of each multicore optical fiber having the second draw direction is placed in the trunk connector interface to define a first connector core pattern having a first mirror image symmetry. Each of the branch connectors includes a branch connector interface and is operatively coupled to the trunk connector by a respective multicore optical fiber from each of the first and second halves of the plurality of multicore optical fibers. Each branch connector is configured so that the second end face of the multicore optical fiber having the first draw direction and the first end face of the multicore optical fiber having the second draw direction is placed in the branch connector interface to define a second connector core pattern having a second mirror-image symmetry.

In an embodiment of the disclosed breakout module, the first mirror-image symmetry may be about an axis of symmetry of the trunk connector interface. The first and second end faces of the plurality of multicore optical fibers may be arranged in a linear array orthogonal to the axis of symmetry in the trunk connector interface such that each first end face is on one side of the axis of symmetry and each second end face is on the other side of the axis of symmetry. Each of the branch connectors may be operatively coupled to a respective pair of multicore optical fibers associated with first and second end faces on each side of, and the same distance from, the axis of symmetry In another embodiment of the disclosed breakout module, the first mirror-image symmetry may be about an axis of symmetry of the trunk connector interface, the end faces of the trunk connector may be arranged in a linear array orthogonal to the axis of symmetry such that the first end faces alternate with the second end faces, and each of the branch connectors may be operatively coupled to a pair of multicore optical fibers having adjacent end faces at the trunk connector interface of the trunk connector.

In another aspect of the disclosure, a method of making the structured multicore fiber optic cabling system is disclosed. The method includes providing the first cable connector including the first cable connector interface, providing second cable connector including the second cable connector interface, and providing the first plurality of multicore optical fibers each including the first end face having the first end face core pattern and the second end face having the second end face core pattern that is the mirror-image of the first end face core pattern. The method further includes arranging the first plurality of multicore optical fibers so that the first half thereof has the first draw direction, and the second half thereof has the second draw direction opposite the first draw direction. The method places the first end face of each multicore optical fiber having the first draw direction and the second end face of each multicore optical fiber having the second draw direction in the first cable connector interface to define the first connector core pattern having the first mirror-image symmetry, and places the first end face of each multicore optical fiber having the second draw direction and the second end face of each multicore optical fiber having the first draw direction in the second cable connector interface to define the first connector core pattern. The method further includes providing the plurality of network components. Each of the network components includes the port connector having the port connector interface with the plurality of end faces. The first half of the plurality of end faces has the first end face core pattern, and the second half of the plurality of end faces has the second end face core pattern. The method further includes placing each end face of the plurality end faces in the port connector interface to define the first connector core pattern, operatively coupling one of the first cable connector or the second cable connector to the first port connector of the first network component of the plurality of network components, and operatively coupling the other of the first cable connector or the second cable connector to the second port connector of the second network component of the plurality of network components. Core polarity is thereby preserved between the first network component and the second network component regardless of whether the first cable connector or the second cable connector is operatively coupled to the first port connector.

In an embodiment of the disclosed method, the method may further include providing the first alignment key to the first connector that defines the orientation of the first connector, and providing the second alignment key to the second connector that defines the orientation of the second connector.

In another embodiment of the disclosed method, the method may further include placing the first cable alignment key on the first cable connector at the first placement relative to the first connector core pattern of the first cable connector, placing the second cable alignment key on the second cable connector at the first placement relative to the first connector core pattern of the second cable connector, placing the first port alignment key on the first port connector at the second placement relative to the first connector core pattern of the first port connector, and placing the second port alignment key on the second port connector at the second placement relative to the first connector core pattern of the second port connector. The method may further include aligning, in each cable connector interface and each port connector interface, the first and second end faces of the first plurality of multicore optical fibers in one or more arrays that are orthogonal to the key-axis of the respective connector. The second placement relative to the first connector core pattern may be opposite the first placement relative to the first connector core pattern. The key-axis of each connector may lie in the plane which bisects the respective connector and is aligned with the cable alignment key or the port alignment key of the respective connector. The core polarity may be preserved between the first and second network components when the first and second port connectors are operatively coupled to each other through the first and second cable connectors, and each of the first and second cable alignment key orientations are opposite the respective first or second port alignment key to which they are operatively coupled.

In another embodiment of the disclosed method, the first port connector of each of the first and second network components may be the trunk connector having the first connector core pattern, and at least one of the first and second network components may be one of the plurality of breakout modules. In this embodiment, the method may further include providing each breakout module with the second plurality of multicore optical fibers each including the first end face and the second end face, configuring the second plurality of multicore optical fibers so that the first half thereof has the first draw direction and the second half thereof has the second draw direction, providing each breakout module with the plurality of branch connectors each including the branch connector interface, operatively coupling each branch connector to the trunk connector by the respective multicore optical fiber from each of the first and second halves of the second plurality of multicore optical fibers, and placing the second end face of the multicore optical fiber having the first draw direction and the first end face of the multicore optical fiber having the second draw direction in the branch connector to define the second connector core pattern having the second mirror-image symmetry in the branch connector interface.

In another embodiment of the disclosed method, the method may further include placing the first cable alignment key on the first cable connector in the first placement relative to the first connector core pattern of the first cable connector, and placing the second cable alignment key on the second cable connector in the second placement relative to the first connector core pattern of the second cable connector that is opposite the first placement relative to the first connector core pattern.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1A:
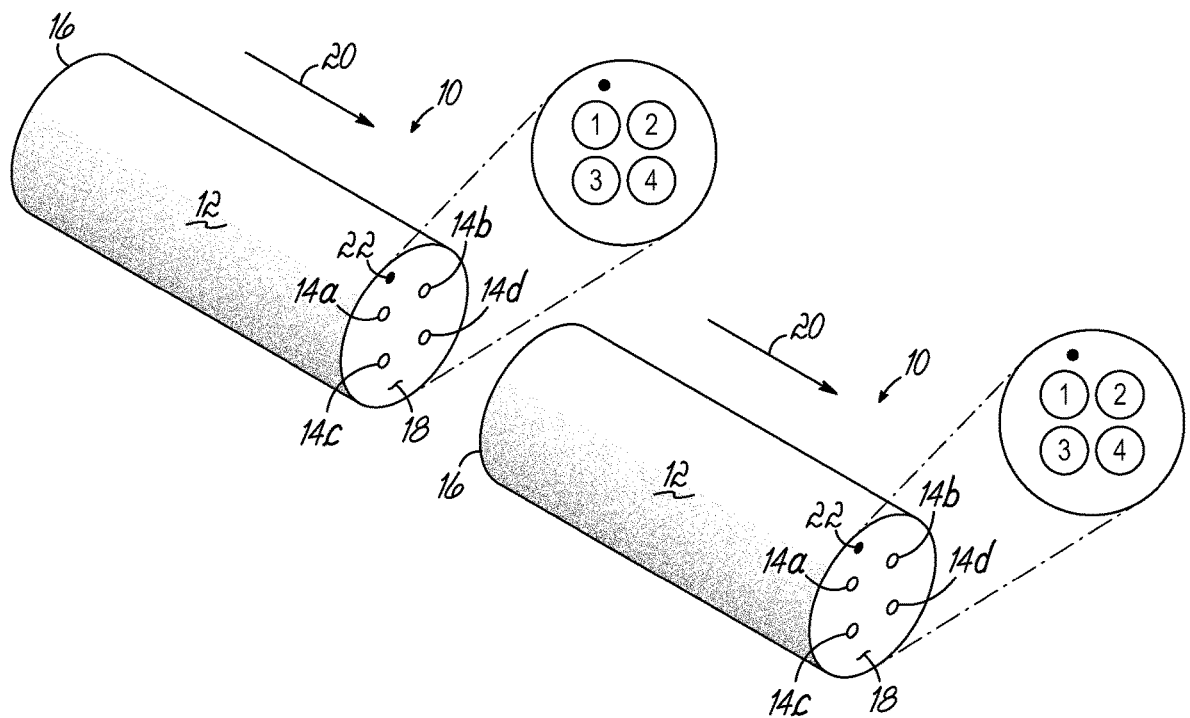
FIGS. 1A and 1B are perspective views of exemplary multicore optical fibers having a reference core identified by a marker and showing the effects of draw direction on core polarity.
Figure 1B:
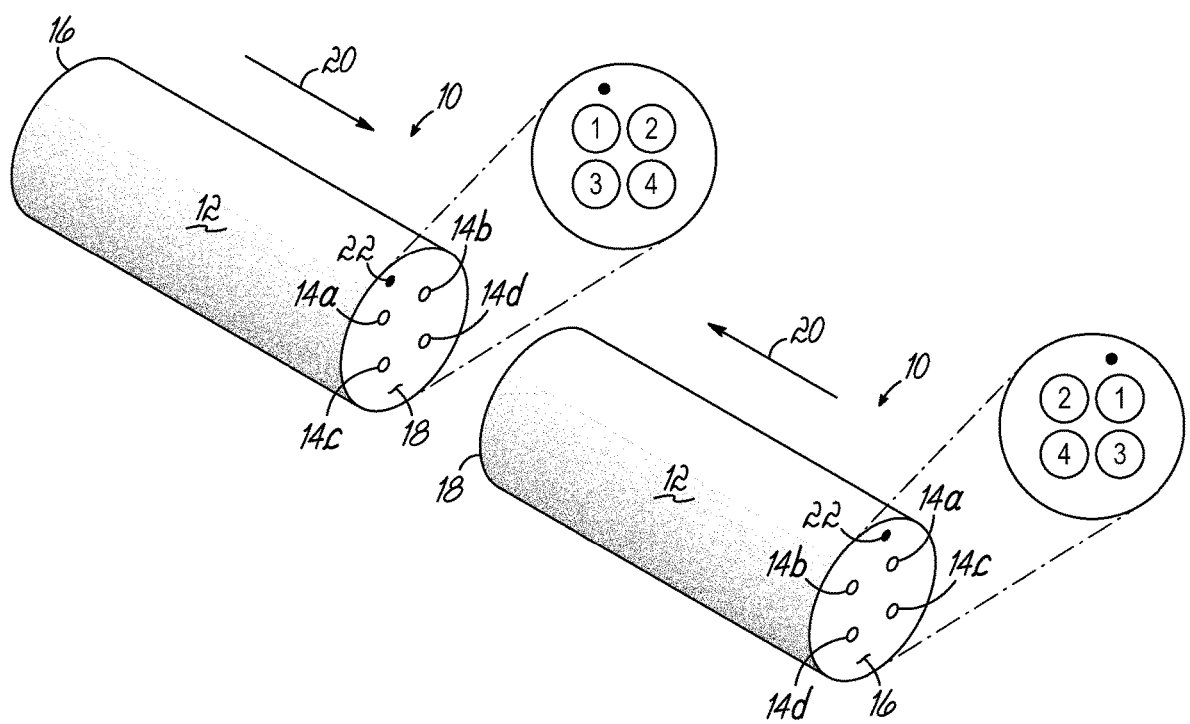
Figure 2A:
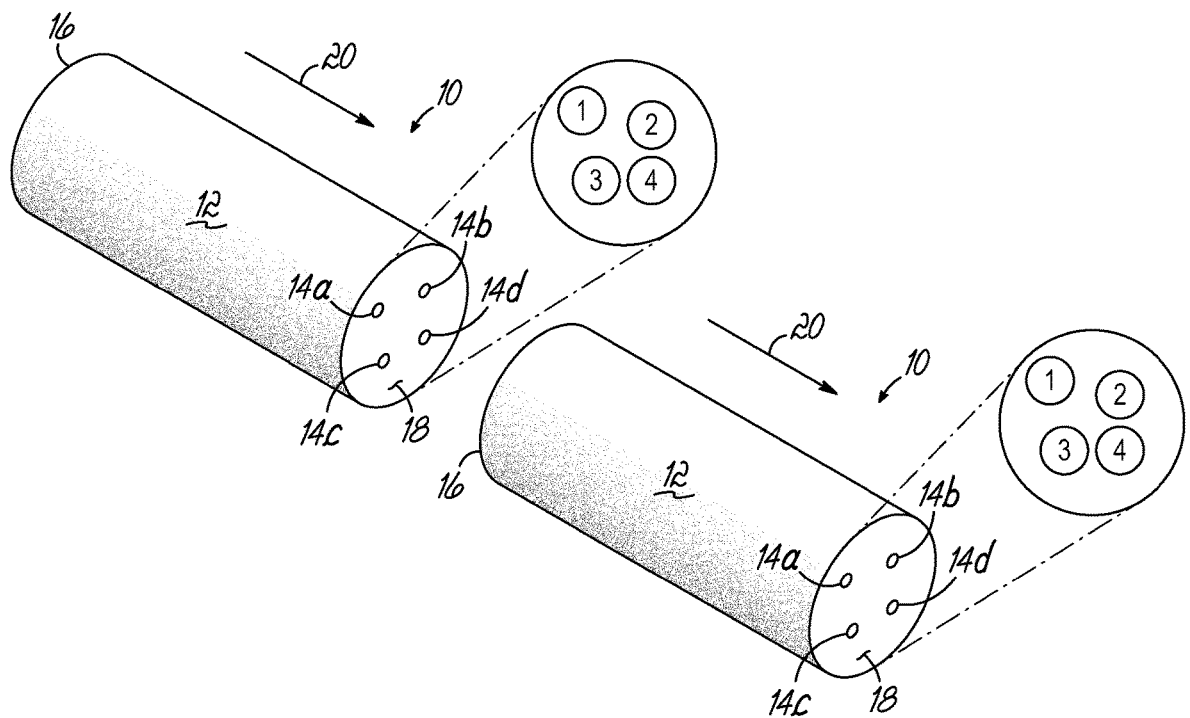
FIGS. 2A and 2B are perspective views of exemplary multicore optical fibers having a reference core identified by being in an off position and showing the effects of draw direction on core polarity.
Figure 2B:
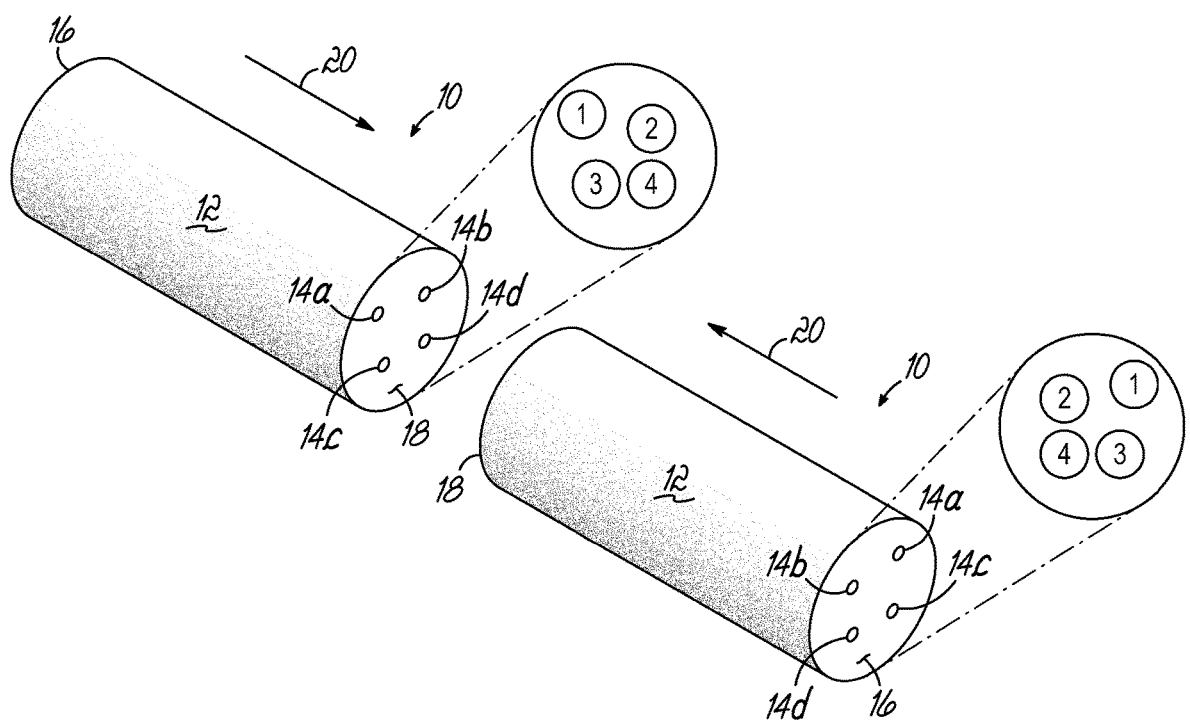
Figure 3A:
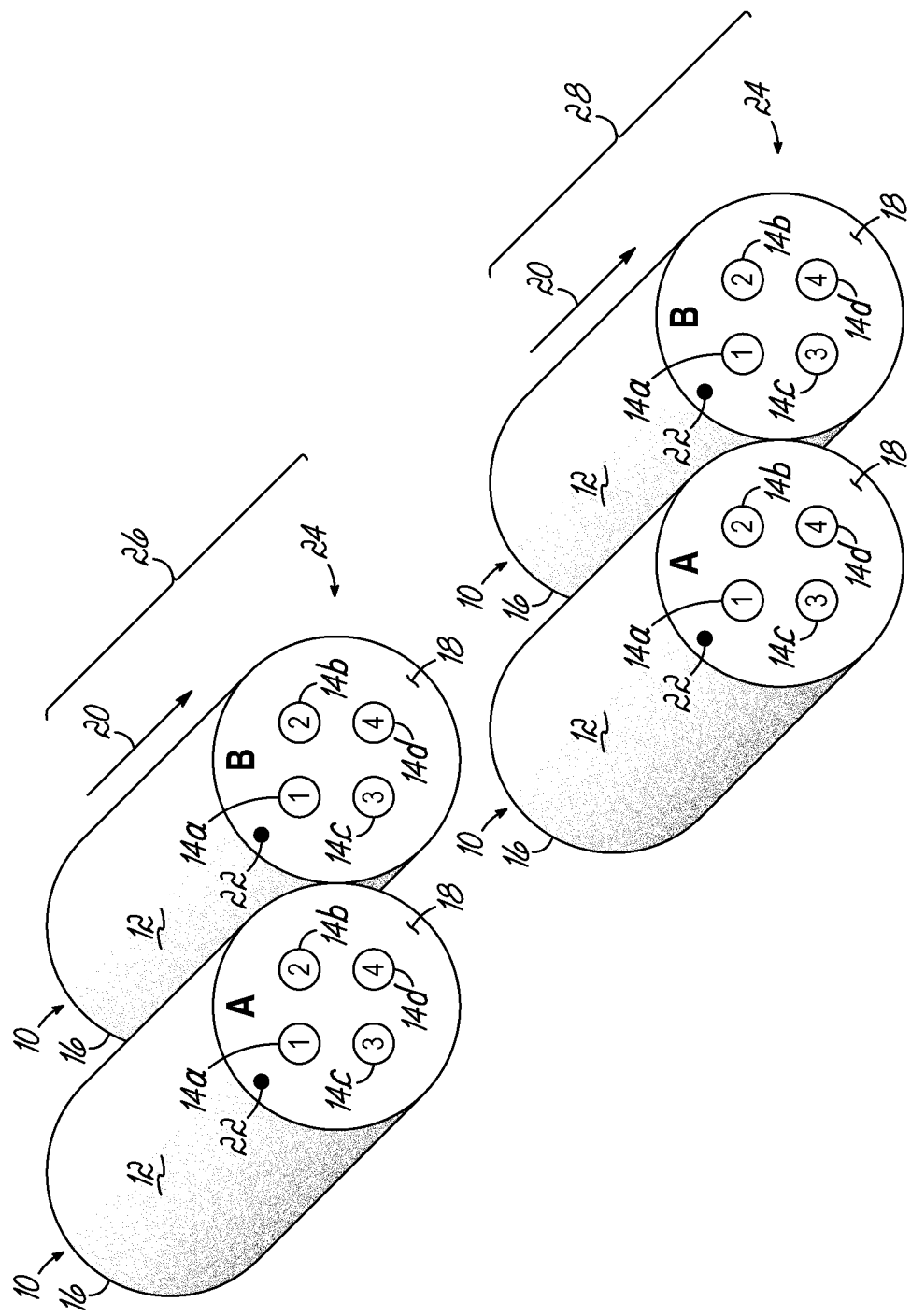
FIGS. 3A-3C are perspective views of exemplary optical fiber ribbons each including a plurality of multicore optical fibers and showing the effects of draw direction on core polarity.
Figure 3B:
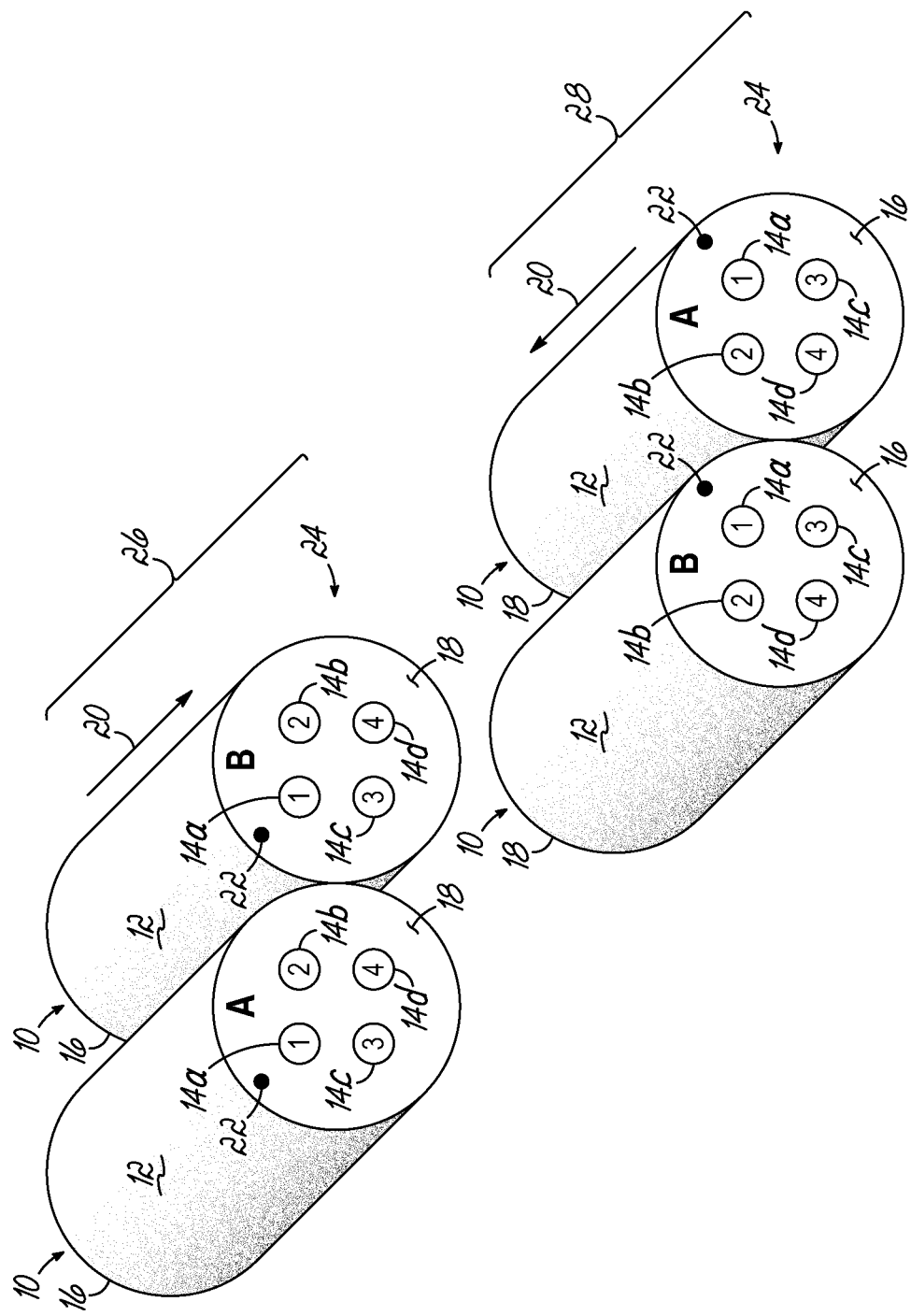
Figure 3C:
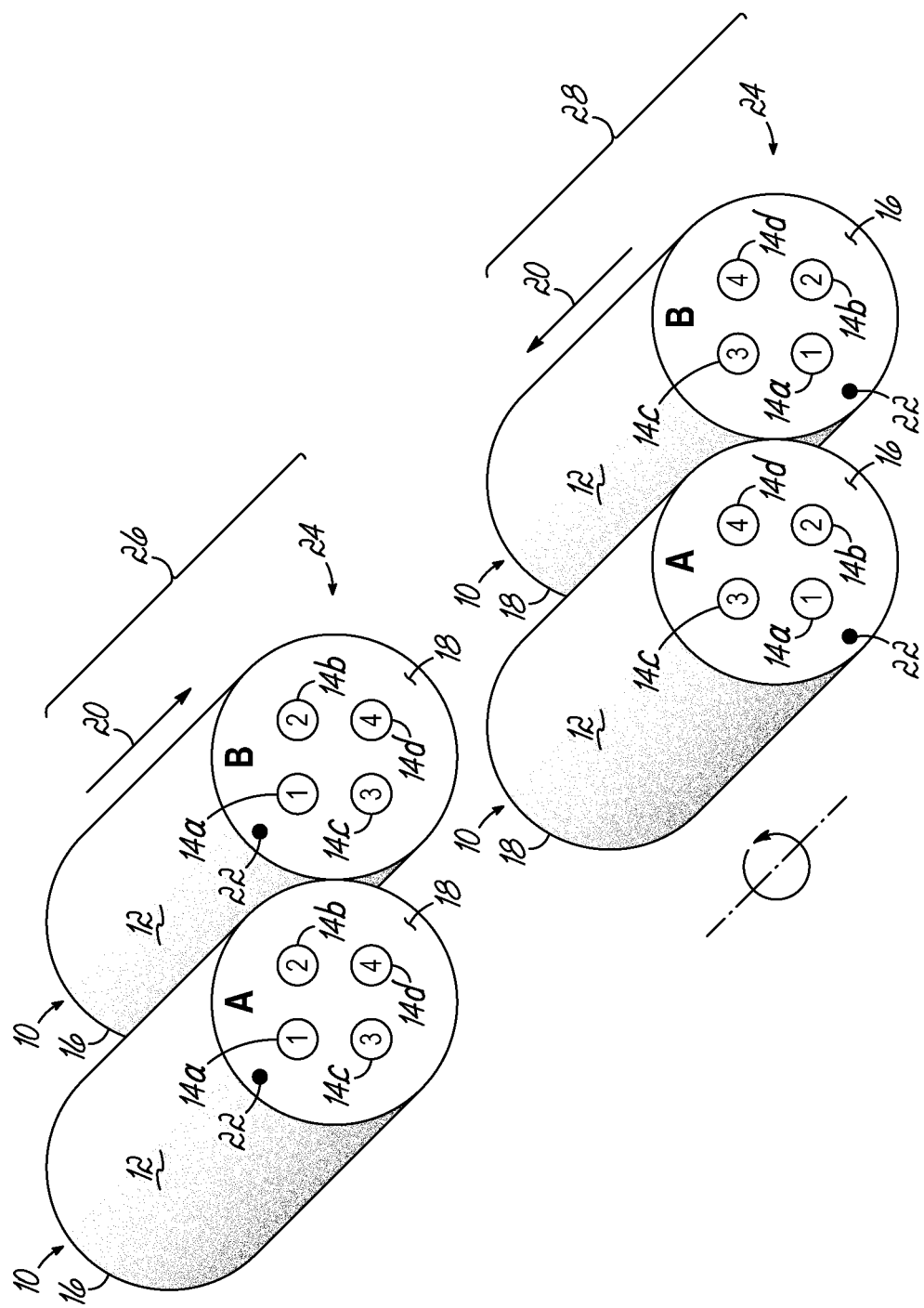

Various embodiments will be further clarified by the examples described below. In general, the below description relates fiber optic cabling systems, cable assemblies, and other fiber optic network components including one or more fiber optic connectors, which may also be referred to as "optical connector", or simply "connector". The connectors include an anti-parallel multicore optical fiber arrangement that provides a connector core pattern having mirror-image symmetry at the connector interface. The connector core pattern is the pattern of the cores in the multicore fiber arrangement, at the connector interface. Thus, the connector core pattern is defined by the placement of the end faces of the multicore optical fibers in the connector interface. Placement of the end faces refers to selecting both the position and orientation of each end face in the connector interface such that the core pattern of each end face provides a portion of the desired connector core pattern.

The front and back end faces of each of the multicore optical fibers may be operatively coupled to respective front and back connectors such that a resulting fiber optic cable assembly can be used as a full duplex patch cord. The terms "front" and "back" are merely used in this disclosure in a relative sense to distinguish between different ends of a component (e.g., a multicore optical fiber, a cable assembly, etc.). The disclosed fiber optic cable assemblies may be used to provide at least part of a structured multicore optical fiber cabling system that maintains consistent core polarity between network nodes at both the connector and optical fiber level.

Aspects of the disclosure may be applied, but are not limited, to duplex LC connectors (e.g., according to IEC 61754-20: 2012) and very-small form factor (VSFF) dual-ferrule connectors such as CS, SN, or MDC-type connectors (e.g., each according to the Quad Small Form Factor Pluggable Double Density Multi Source Agreement hardware specification revision 6.3 and the documents referred to therein). VSFF dual-ferrule connectors include two single-fiber ferrules within a common housing. Corresponding connector interfaces for network components such as transceivers and cassettes (also referred to as "modules") are also disclosed.

Another class of very small form factor array connectors include the MMC connector available from US Conec of Hickory NC, United States, and the SN-MT connector available from Senko of Boston MA, United States. VSFF connectors may increase front panel density by about three times as compared to standard MPO connectors. A VSFF connector typically includes an alignment key located on the narrow side of the connector body to enable easy stacking of multiple VSFF connectors. This feature may impact multicore fiber optic trunk cable design in methods not covered by the TIA-568 standard. By way of comparison with standard MPO connectors (which may be considered as "row connectors") the MMC/SN-MT connectors may be considered as "column connectors". For angled single mode connectors, the mating connectors may have the alignment keys aligned in the same orientation.

The above general statements may be better understood when considering the definitions of terms used in the statement. With respect to multicore optical fibers having a draw direction due to an asymmetric end face core pattern (see Background section above), the term "anti-parallel" refers to at least two of such multicore optical fibers being terminated by one or more connectors, but having opposite draw directions at each connector. And finally, term "mirror-image symmetry" refers to there being intended symmetry of the connector core pattern and/or fiber end face core pattern about an axis of symmetry of the connector interface and/or fiber end face that: a) is in a plane orthogonal to a longitudinal axis of the connector and/or optical fiber, and b) bisects the connector interface and/or fiber end face.

The mirror-image symmetry of the connector core patterns at the connector interfaces enables connections between fiber spans to maintain core polarity independent of the direction of the cable assemblies being connected. Cable assemblies and other fiber optic network components (e.g., transceivers, fan-in/fan-out devices, etc.) configured in accordance with the disclosed embodiments allow consistent core polarity mapping from one span to another independent of the cable direction, and thereby facilitate deployment of efficient structured multicore fiber optic cabling systems that include such fiber optic network components.

In particular, fiber optic network components of the present disclosure include anti-parallel multicore optical fibers. The anti-parallel multicore optical fibers may be arranged in the fiber optic network component in any manner that results in the connector interfaces thereof having mirror-image symmetry with regard to the connector core pattern. This mirror-image symmetry allows one fiber optic network component to be connected to another fiber optic network component by a cable assembly having the same mirror-image symmetry without regard to the direction of the cable assembly. As described in detail below, this bi-directional connectivity provides unique advantages over known arrangements.

Multicore optical fibers are manufactured with different core configurations. Common configurations of multicore optical fiber have a cladding diameter of 125 μm and a 2×2 or 1×4 core configuration. This enables the use of cores with mode field diameters similar to those of a standard single core fiber. However, larger numbers of cores can be accommodated by reducing the mode field diameter, increasing the diameter of the cladding, or both reducing the mode field diameter and increasing the diameter of the cladding.

Disclosed embodiments include an optimized structured multicore fiber optic cabling system for high fiber count connectivity in data centers. The structured multicore fiber optic cabling system may include one or more pre-terminated (e.g., MPO) multicore fiber optic trunk cables, breakout modules (e.g., breakout cassettes, breakout harnesses, fan-in/fan-out components, etc.) transceiver interfaces, and duplex patch cords to support different network configurations and transceiver types. These network components may enable the structured multicore fiber optic cabling system to manage fiber polarity and alignment key orientations with consistent interfaces on both sides of each multicore fiber optic trunk cable in the cabling system.

Figure 4:
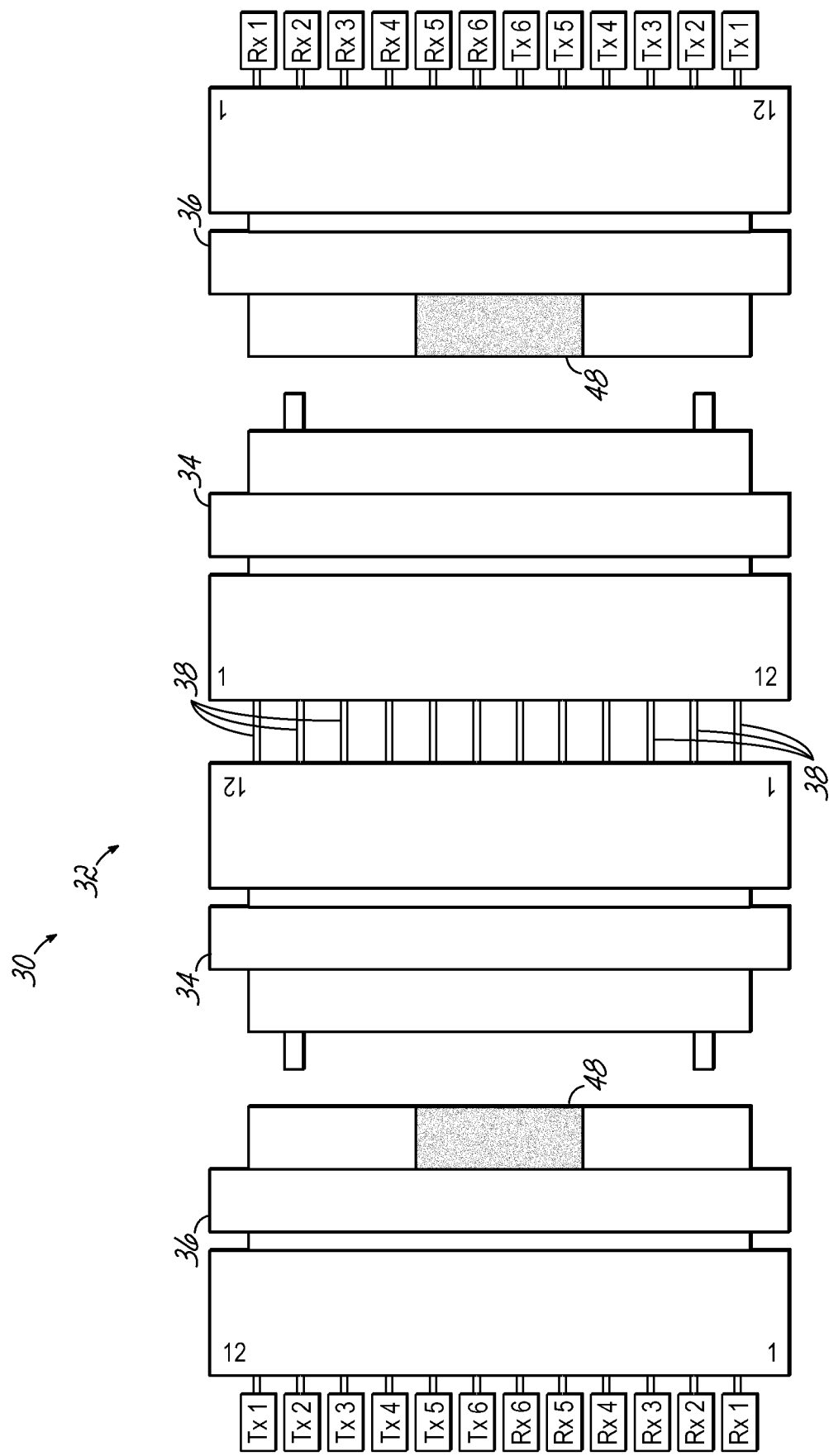
FIG. 4 is a schematic view of an exemplary structured multicore fiber optic cabling system including a fiber optic cable assembly and a pair of port connectors. The fiber optic cable assembly includes a plurality of multicore optical fibers terminated by cable connectors matching the port connectors.

FIG. 4 depicts an exemplary structured multicore fiber optic cabling system 30 including a multicore fiber optic cable assembly 32. The multicore fiber optic cable assembly 32 includes a plurality of multicore optical fibers 38, and is terminated at each end by a respective cable connector 34. Each cable connector 34 is configured to receive a matching port connector 36. The term "port connector" is generally used herein to differentiate between a connector terminating a cable (i.e., a "cable connector") and a connector configured to receive the cable connector. Port connectors may include, but are not limited to, connectors of a transceiver, breakout module, cross-connect, or other network component. In some cases, the term port connector may be used refer to the combination of a cable connector and an adapter, or a cable connector that is otherwise configured to receive another cable connector. In some cases, a cable or port connector may be referred to as a "trunk connector", a "branch connector", or a "transceiver connector" to provide an indication of the function of the connector and/or differentiate between different connectors within a network element or cabling system.

Each of the connectors 34, 36 of FIG. 4 includes an alignment key 48. The cable connectors 34 are depicted in a "key-down" orientation in which the alignment key is not visible, while the port connectors 36 are depicted in a "key-up" orientation. It should be understood that the terms "key-up" and "key-down" are used herein to indicate connector orientation relative to another connector, and are thus somewhat arbitrary in terms of absolute position. The key-up orientation is generally indicated by an alignment key 48 that is on the top side of the connector 34 in front views and that is outward facing in top views. In contrast, the key-down orientation is generally indicated by an alignment key 48 that is on the bottom side of the connector 34 in front views and that is hidden from view in top views. Connectors may be operatively coupled so that their alignment keys have the same orientation (e.g., both connectors in the key-up orientation or the key-down orientation) or so that their alignment keys have the opposite orientation (e.g., one connector in the key-up orientation and the other connector in the key-down orientation).

Figure 7:
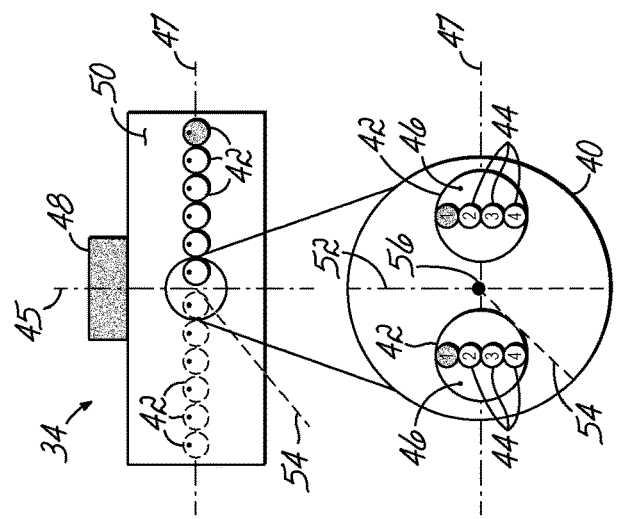
FIGS. 5-7 are schematic views of exemplary connectors such as may be used in the cabling system of FIG. 4.
Figure 6:
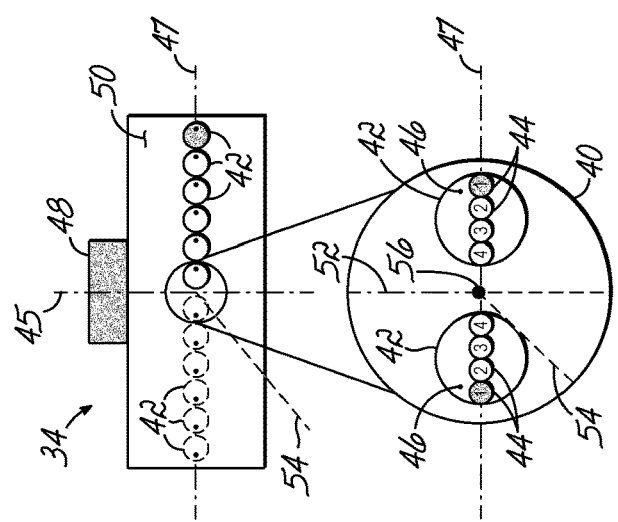
Figure 5:
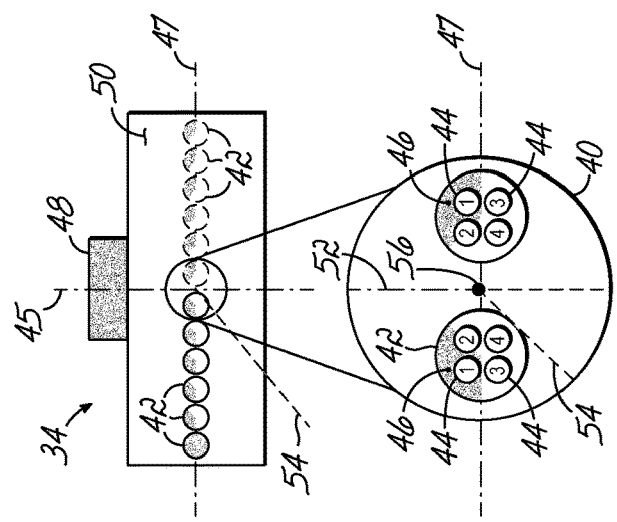

FIGS. 5-7 depict exemplary embodiments of the cable connector 34 for exemplary 2×2 and 1×4 four-core multicore fibers. The structured multicore fiber optic cabling system 30 is depicted as using a TIA-568 method-B or other symmetric design in which the multicore fiber optic cable assembly 32 is a key-down to key-down array patch cord that uses key-up to key-down adaptors (not shown). The port connectors 36 may, for example, operatively couple the cable connectors 34 to breakout modules. These breakout modules may be operatively coupled to transceivers directly or using straight-through A-to-B duplex patch cords. The port connectors 36 may have the same configuration so that the components on both sides of the multicore fiber optic cable assembly 32 can be interchanged.

The exemplary multicore fiber optic cable assembly 32 includes a plurality of multicore optical fibers 38 (e.g., 12 multicore optical fibers) arranged in a linear array that is orthogonal to a key-axis 45 of the connector 34. The key axis 45 lies in a plane that bisects the connector 34 and is aligned with (i.e., passes through) an alignment key 48 thereof. As best shown by magnified views 40 of a portion of the connector 34, each multicore optical fiber 38 includes an end face 42, a plurality of cores 44 (e.g., four cores) within a common cladding, and a marker 46. The exemplary core configurations depicted include a 2×2 configuration (FIG. 5) and a 1×4 configuration (FIGS. 6 and 7). However, other numbers of cores and configurations may be used. For purposes of illustration only, and to facilitate identification by the reader, each core 44 is depicted with a number (e.g., "1", "2", "3" or "4"). The marker 46 indicates the location of reference core 44, which is labeled with number "1".

Using the 2×2 four-core multicore optical fiber of FIG. 5 as an example, each transmitter or receiver operatively coupled to the multicore optical fiber may support four channels. These channels may be numbered according to the core polarity, e.g., as illustrated FIG. 5. Markers in multicore optical fibers may facilitate consistent mapping of core polarity across each connection, such that each transceiver channel is correctly connected. For purposes of clarity, a depiction similar to a Harvey Ball is used herein to depict core polarity of 2×2 four-core multicore optical fibers. This method of depiction locates core 1 in the fully covered quadrant and core 2 in the half covered quadrant, thereby uniquely defining the core polarity. Notice that when viewing from the opposite end of the multicore optical fiber, the polarity becomes the mirror-image of the other end face. Optimally, the multicore optical fiber core polarity is matched throughout each connection while managing the fiber polarity using the TIA-568 methods.

The exemplary 1×n core multicore optical fibers are depicted in one of two orientations; however other orientations may be used. FIG. 6 depicts the cores 44 in an orientation where they are colinear with a cross-axis 47 of the connector. The cross-axis 47 bisects the connector 34 along a plane perpendicular to the key-axis 45. The cross-axis alignment depicted by FIG. 6 may be advantageous for high density edge coupling of waveguides, and therefore preferred in a high-density transceiver interface, for example. FIG. 7 depicts the cores 44 in an orientation where they are parallel to the key-axis 45.

The marker 46 defines an asymmetry in the core pattern of each multicore optical fiber 38. This asymmetry allows the identity of each core 44 of the multicore optical fiber 38 to be determined based on the position of the core 44 relative to a reference core 44, e.g., the core nearest the marker 46. For example, once the reference core 44 is identified, the remaining cores 44 may be identified based on a predetermined naming convention for the cores 44. Although the core pattern asymmetry is depicted in this and the following examples as being provided by the marker 46, it should be understood that a core pattern asymmetry can also be provided by arranging the cores in an asymmetric pattern within each individual multicore optical fiber, e.g., by using an off position reference core.

Each cable connector 34 includes a connector interface 50 in which the end faces 42 of multicore optical fibers 38 are placed to collectively define a pattern of cores 44 which has mirror-image symmetry, i.e., symmetry about an interface axis of symmetry 52. The interface axis of symmetry 52 may be normal to a longitudinal axis 54 of cable connector 34, and may be colinear with one of the key-axis 45 (as depicted in FIGS. 5-7) or the cross-axis 47 of the connector. In non-angled connectors, the longitudinal axis 54 of cable connector 34 may be normal to the connector interface 50 and pass through the geometric center of the connector interface 50. That is, the longitudinal axis 54 of cable connector 34 may be generally centered in and orthogonal to the connector interface 50. In angled connectors, the longitudinal axis 54 may pass through the geometric center of the connector interface 50 at an angle corresponding to that of the connector, e.g., between 5 and 15 degrees. In any case, the intersection of the longitudinal axis 54 and connector interface 50 may define a center point 56 on the connector interface 50 through which the interface axis of symmetry 52 passes.

It is contemplated that optical transceivers may be integrated into tiny integrated circuits, commonly referred to as "chiplets". These chiplets may facilitate onboard optics or co-packaged optics, and are expected to support much higher bandwidths than existing pluggable optical transceivers. Transceiver chiplets are anticipated to have array multicore optical fiber interfaces similar to that of parallel single mode transceivers, with added channels in each core of the multicore optical fiber. Linear array multicore optical fiber core configurations may be advantageous for edge coupling to waveguides from transceiver chiplets. In particular, lx n multicore optical fiber may be a preferred solution for intra-building data center interconnects.

FIGS. 6 and 7 depicts two configurations of connector interface 50 that each provide mirror-image symmetry. In FIG. 6, the cores are colinearly aligned, which may be preferred for edge coupling to a waveguide of a transceiver chiplet. For multicore replacements of pre-terminated single-core fiber optic cabling systems, the configuration in FIG. 6 may be preferred because it supports chip edge coupling and the fiber orientations are the same for both key-up and key-down connectors. Patch cords may also be made that have the connector interface 50 of FIG. 6 at one end of the patch cord and the connector interface 50 of FIG. 7 at the other end of the patch cord.

The connectors 34 depicted in FIGS. 5-7 may be duplex LC, CS, SN, or MDC connectors, or any other suitable connector, consistent with general statements about this disclosure at the beginning of this Detailed Description section. The marker 46 may be oriented in other angles as long as the end faces 42 of the multicore optical fibers 38 are oriented so that the connector core pattern of connector interface 50 has mirror-image symmetry. In practice, it may be desirable to standardize the orientation of the markers 46 with respect to the connector interface 50 to facilitate multi-vendor interoperability. For example, the markers 46 could be standardized as being oriented parallel to a key-up direction.

Figure 8:
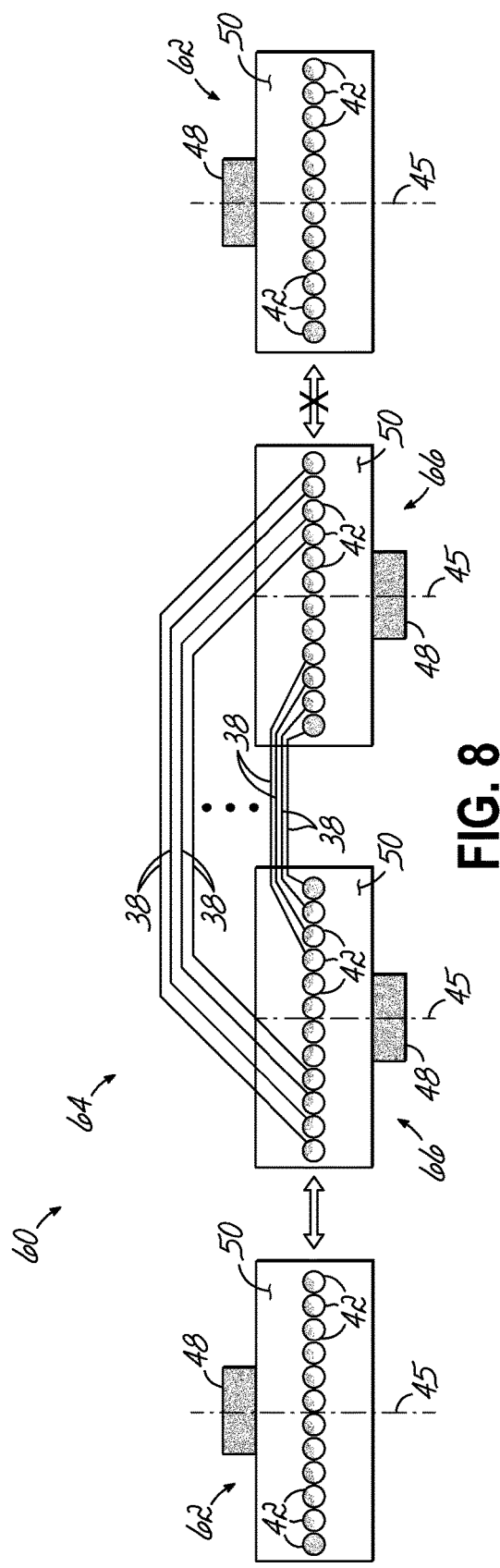
FIG. 8 is a schematic view of an exemplary structured multicore fiber optic cabling system including a plurality of multicore optical fibers having the same draw direction.

FIG. 8 depicts an exemplary structured multicore fiber optic cabling system 60 including port connectors 62 operatively coupled by a multicore fiber optic cable assembly 64. The multicore fiber optic cable assembly 64 includes a plurality of multicore optical fibers 38 and cable connectors 66 that terminate each end thereof. The end faces 42 of multicore optical fibers 38 are arranged in a linear array that is orthogonal to the key-axis 45 of the connector 62, 66. Each of the multicore optical fibers 38 of multicore fiber optic cable assembly 64 has the same draw direction, and each of the end faces 42 has the same orientation. This results in the connector interfaces 50 of cabling system 60 having connector core patterns that lack mirror-image symmetry.

The port connectors 62 and cable connectors 66 include respective alignment keys 48 that facilitate operatively coupling the connectors 62, 66 in a predetermined orientation with respect to each other. Although the exemplary alignment keys 48 are depicted as being on the outer surface of the connectors 62, 66, it should be understood that other ways of ensuring consistent connection orientations may be used, such as connector markings, keyed shapes, or internal alignment keys. Accordingly, aspects of the present disclosure are not limited to any particular type of connector keying, or the use of connectors having keys.

Due to the directionality of the multicore optical fibers 38, the connector core patterns are different at the front and back ends of the multicore fiber optic cable assembly 64. The connector core pattern of a standardized port connector 62 can therefore only match one end of the multicore fiber optic cable assembly 64. In the present example, the core polarity of the cable connector 66 on the front end of multicore fiber optic cable assembly 64 (left side of FIG. 8) matches that of the port connector 62 to which it is to be connected. That is, when coupled, each core 44 of each multicore optical fiber 38 of cable connector 66 is aligned with a correspondingly numbered core 44 of the port connector 62.

In contrast, the core polarity of the back end cable connector 66 of multicore fiber optic cable assembly 64 does not match that of the port connector 62 to which it is to be connected. Thus, when coupled, each core 44 of each multicore optical fiber 38 in the back end cable connector 66 is aligned with a differently numbered core 44 of the port connector 62. Specifically, for each end face 42, core 1 in the back end cable connector 66 is aligned with core 2 in the port connector 62, core 2 in the back end cable connector 66 is aligned with core 1 in the port connector 62, core 3 in the back end cable connector 66 is aligned with core 4 in the port connector 62, and core 4 in the back end cable connector 66 is aligned with core 3 in the port connector 62. Accordingly, the connection on the right side of the figure is incorrect, as indicated by the "X" through the double-headed arrow.

Fundamentally, the inability to maintain core polarity using the configuration depicted by FIG. 8 is caused by the one-way connectivity nature of a single multicore optical fiber. When all the fibers are placed parallel to each other in a fiber optic cable terminated with an array connector, the limitation of one-way connectivity remains. This is also evident when comparing the connector end face polarities on both ends of the multicore fiber optic cable assembly 64. Because the core polarities of the connector interfaces 50 are different at each end of the multicore fiber optic cable assembly 64, the cabling system 60 would require different connector interfaces 50 in the port connectors 62 at each end of the multicore fiber optic cable assembly 64. This requirement complicates network management and increases cost by requiring more part numbers.

To address the above core polarity problem, two-way multicore fiber optic trunk cables may be configured so that the multicore optical fibers 38 fibers are divided in two equal groups, with multicore optical fibers 38 within the same group having the same draw direction, and the multicore optical fibers 38 in different groups having opposite draw directions. This is referred to herein as a Type-B multicore fiber optic cable, examples of which and described in detail below.

Figure 9:
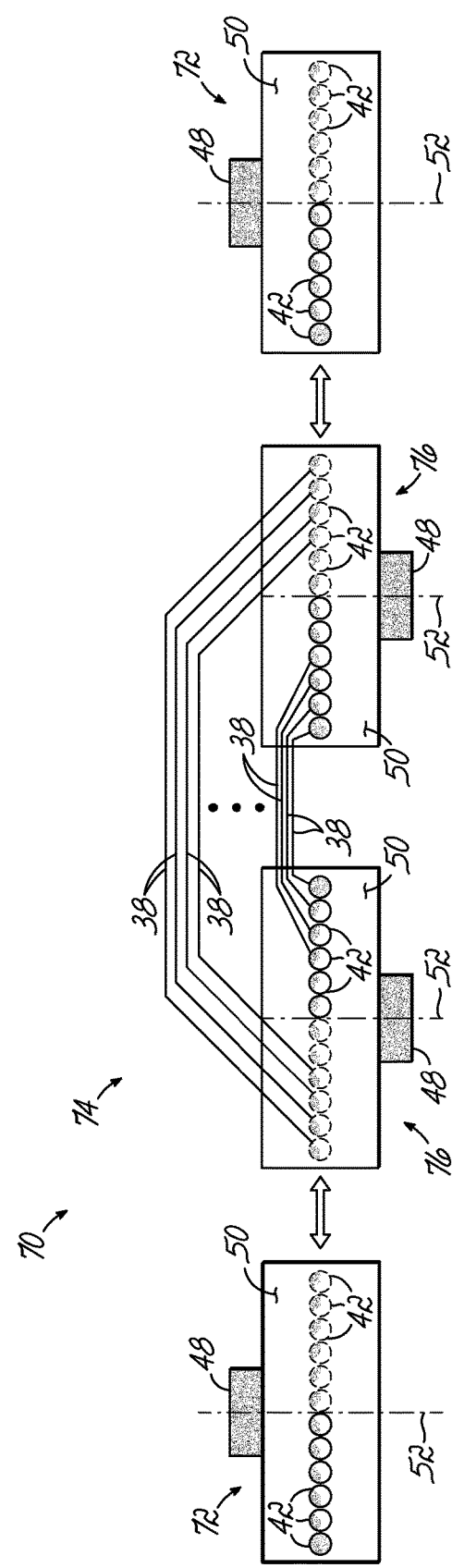
FIGS. 9 and 10 are schematic views of exemplary structured multicore fiber optic cabling systems including a plurality of multicore optical fibers in which one half of the plurality of multicore optical fibers have one draw direction and the other half of the plurality of multicore optical fibers have a different draw direction.

FIG. 9 depicts an exemplary structured multicore fiber optic cabling system 70 including port connectors 72 operatively coupled by a multicore fiber optic cable assembly 74. The cable assembly 74 includes a plurality of multicore optical fibers 38, and is terminated at each end by a respective cable connector 76. The multicore optical fibers 38 of cable assembly 74 are arranged so that the optical fibers 38 having end faces 42 on one side of the interface axis of symmetry 52 have one draw direction, and the optical fibers 38 having end faces 42 on the other side of the interface axis of symmetry 52 have the other draw direction, as indicated by the orientations of the end faces 42.

The anti-parallel configuration of the multicore optical fibers 38 of cable assembly 74 enables the connector core patterns to have mirror-image symmetry. This mirror-image symmetry results in core patterns being the same at each end of the cable assembly 74. The connector core pattern of a standardized port connector 72 can therefore match both ends of the cable assembly 74. Thus, the core polarity of the cable connector 76 at each end of cable assembly 74 matches that of the respective port connector 72 to which it is to be connected. Accordingly, when coupled, each core 44 of each multicore optical fiber 38 of each cable connector 76 is aligned with a correspondingly numbered core 44 of its respective port connector 72.

Figure 10:
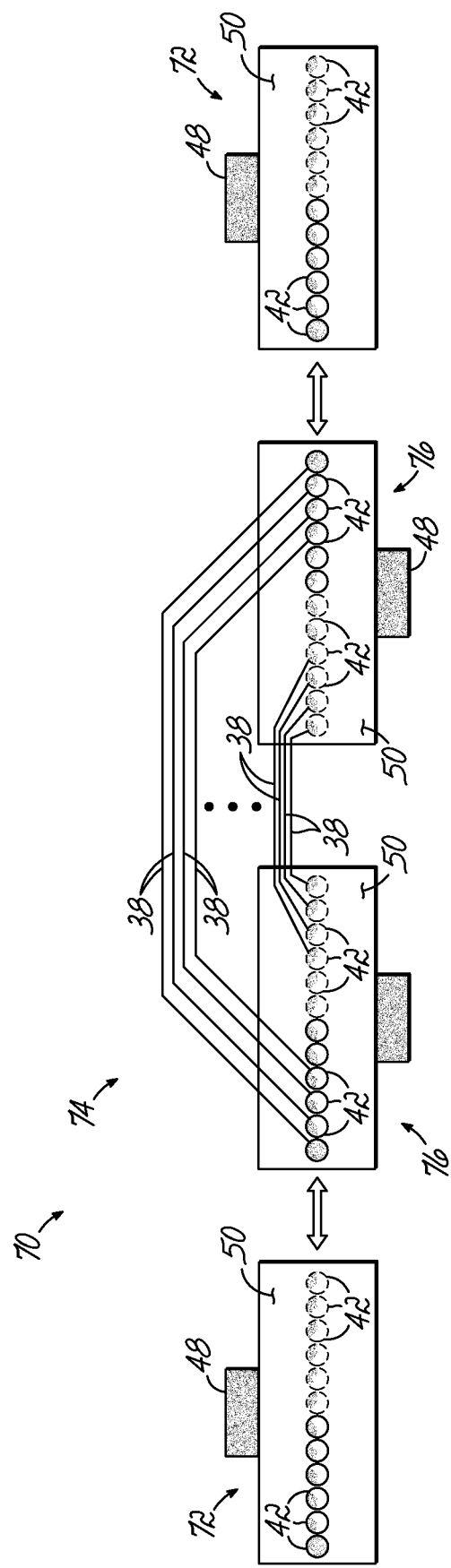

To demonstrate that cabling system 70 is insensitive to the direction of the cable assembly 74, FIG. 10 depicts the cabling system 70 with the cable assembly 74 running in the opposite direction as compared to FIG. 9. As can be seen, both optical fiber polarity and core polarity are preserved. Thus, the ends of cable assembly 74 can be flipped with no change in either the core or fiber polarities. As can be seen from the orientations of the multicore optical fiber markers relative to the connector key positions in the key-up and key-down connectors, the port connectors 72 and cable connectors 76 have the same connector interface 50 configuration on both ends of the cable assembly 74. This standardization reduces the number of different part numbers and allows the cable assembly 74 to be installed in any direction. The depicted structured multicore optical fiber cabling configuration thus preserves the benefits of single core structured cabling systems while keeping consistent core polarities across each of the multicore optical fibers.

Figure 11:
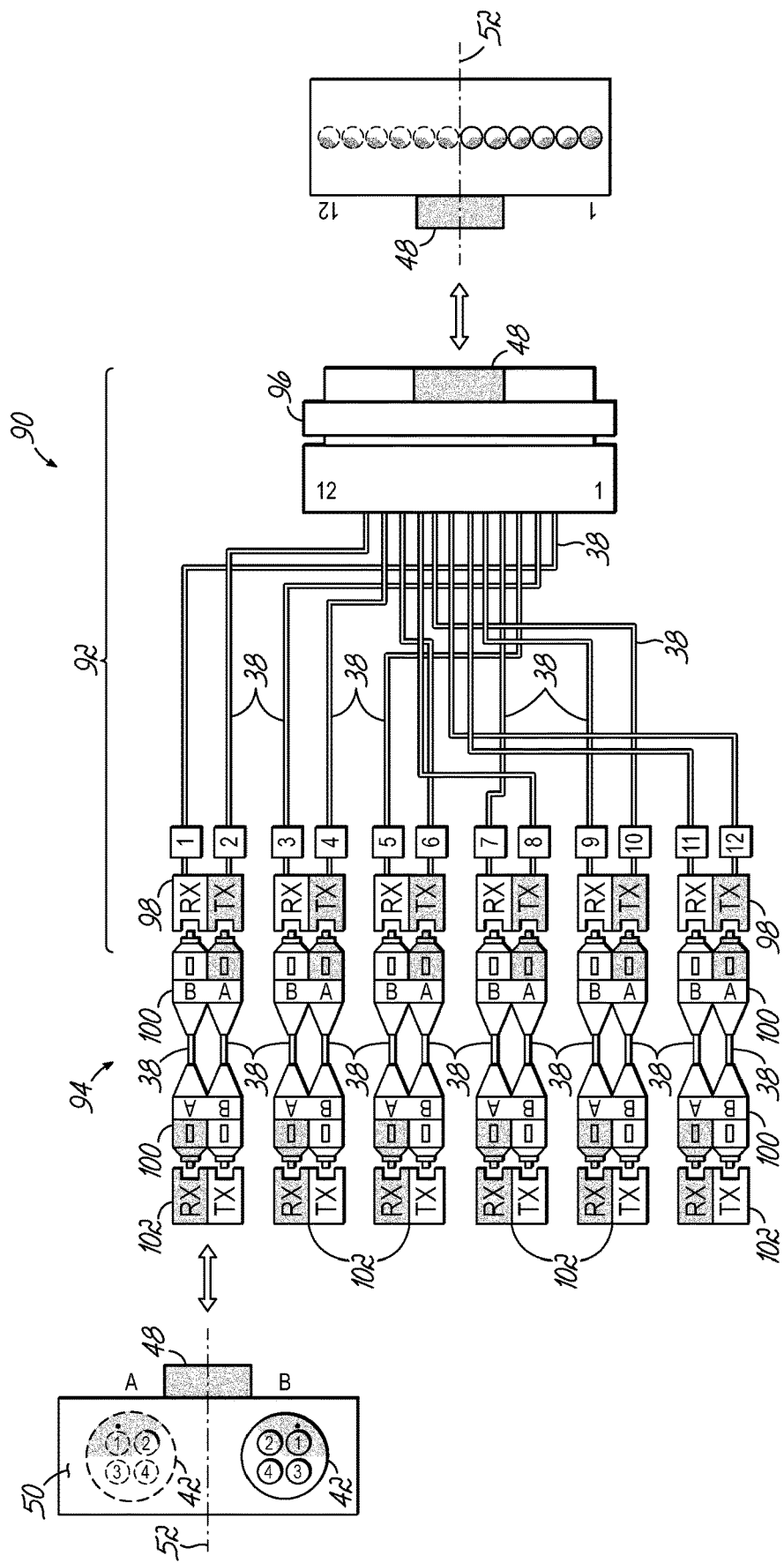
FIGS. 11 and 12 are schematic views of exemplary structured multicore fiber optic cabling systems each including a breakout module.

FIG. 11 depicts a portion of another exemplary structured multicore fiber optic cabling system 90. The cabling system 90 includes a breakout module 92 (e.g., a breakout cassette) and a plurality of multicore A-to-B duplex patch cords 94. The breakout module 92 includes a trunk port connector 96 (e.g., an MPO connector) having a key-up orientation. The trunk port connector 96 is operatively coupled to a plurality of branch connectors 98 (e.g., six branch connectors) by paired multicore optical fibers 38 having a duplex configuration. In the depicted embodiment, the end faces 42 of the multicore optical fibers 38 are arranged in the connector interface 50 so that the end faces 42 of the multicore optical fibers 38 having one draw direction are on one side of the axis of symmetry 52, and the end faces 42 of the multicore optical fibers 38 having the other draw direction are on the other side of the axis of symmetry 52. Each branch connector 98 is operatively coupled to one multicore optical fiber 38 from one side of the axis of symmetry 52, and one multicore optical fiber 38 from the other side of the axis of symmetry 52. The multicore optical fibers 38 may be selected for coupling to the same branch connector 98 based on their position relative to the axis of symmetry 52. For example, by selecting multicore optical fibers 38 having end faces that are the same distance from the axis of symmetry 52.

Each branch connector 98 is shown as being operatively coupled to a respective port connector 102 (e.g., a transceiver connector or branch connector of another breakout device) by a respective duplex patch cord 94. Each duplex patch cord 94 includes a plurality of multicore optical fibers 38 (e.g., two multicore optical fibers) terminated by front and back cable connectors 100. The trunk port connector 96, and each of the branch connectors 98, cable connectors 100, and port connectors 102 includes a connector interface 50 having a connector core pattern with mirror-image symmetry about the interface axis of symmetry 52.

Because both the duplex patch cords 94 and trunk port connector 96 are core polarity invariant, the cabling system 90 supports many of the same configurations used for structured single core fiber optic cabling systems. Thus, trunk cable assemblies can, for example, be connected to a breakout cassette on one end and a breakout harness on the other end. The exemplary trunk port connector 96 supports a total of 12 multicore optical fibers 38, with two multicore optical fibers 38 (e.g., a transmit optical fiber and a receive optical fiber) being operatively coupled to each branch connector 98. However, embodiments are not limited to any particular number of multicore optical fibers or connectors.

Figure 12:
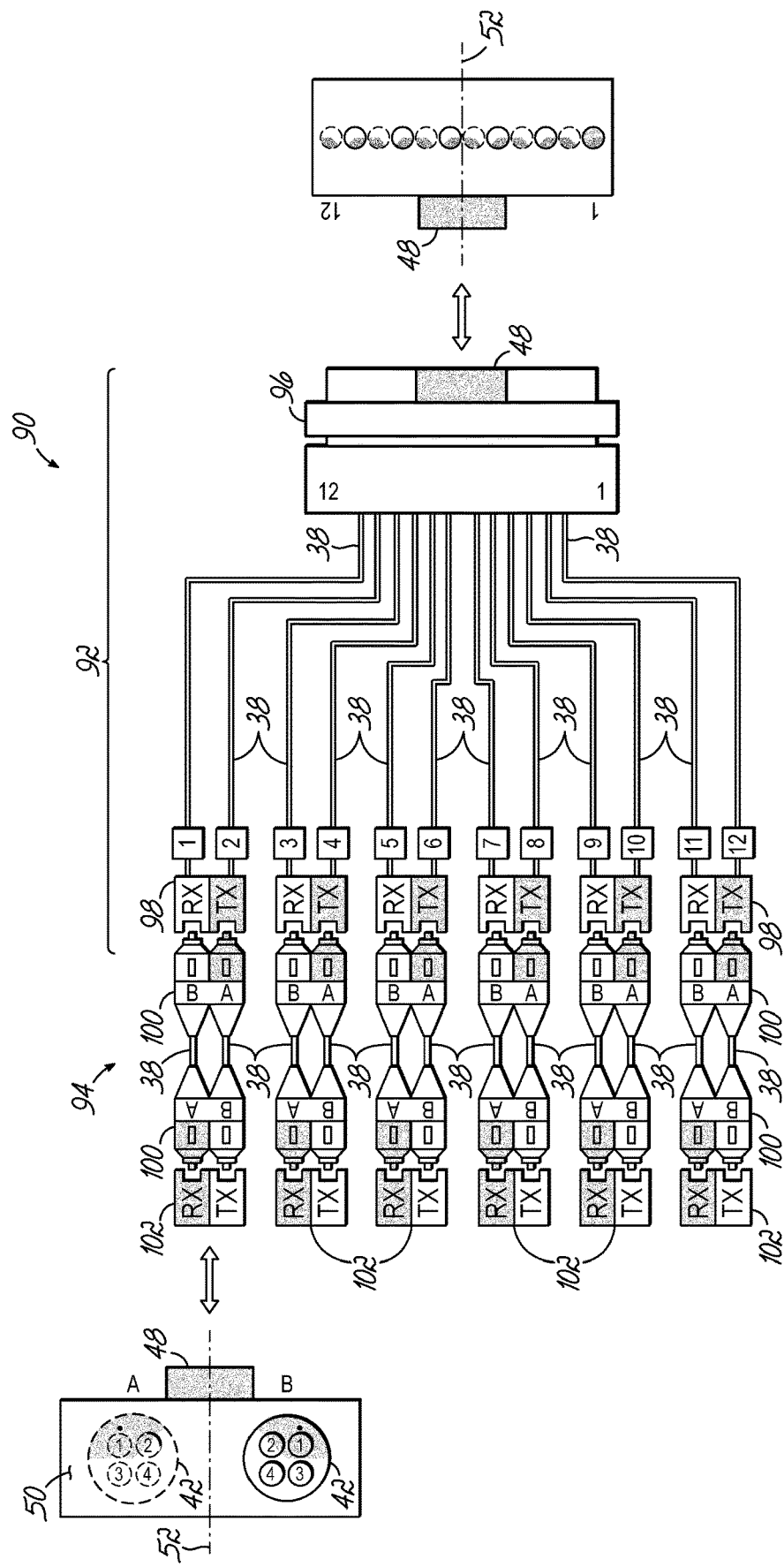

FIG. 12 depicts an alternative embodiment of the cabling system 90 of FIG. 12 in which the multicore optical fibers 38 are arranged so that the optical fibers 38 have alternating draw directions at the trunk port connector 96. This type of arrangement results in a connector core pattern having a mirror-image symmetry that may enable less complex routing of the multicore optical fibers 38 for the breakout module 92 (e.g., a Type-A multicore optical fiber MPO breakout cassette) as compared to the embodiment depicted by FIG. 11. For example, each branch connector 98 may be operatively coupled to a pair of multicore optical fibers 38 having adjacent end faces 42 at the connector interface 50 of trunk port connector 96.

Figure 13:
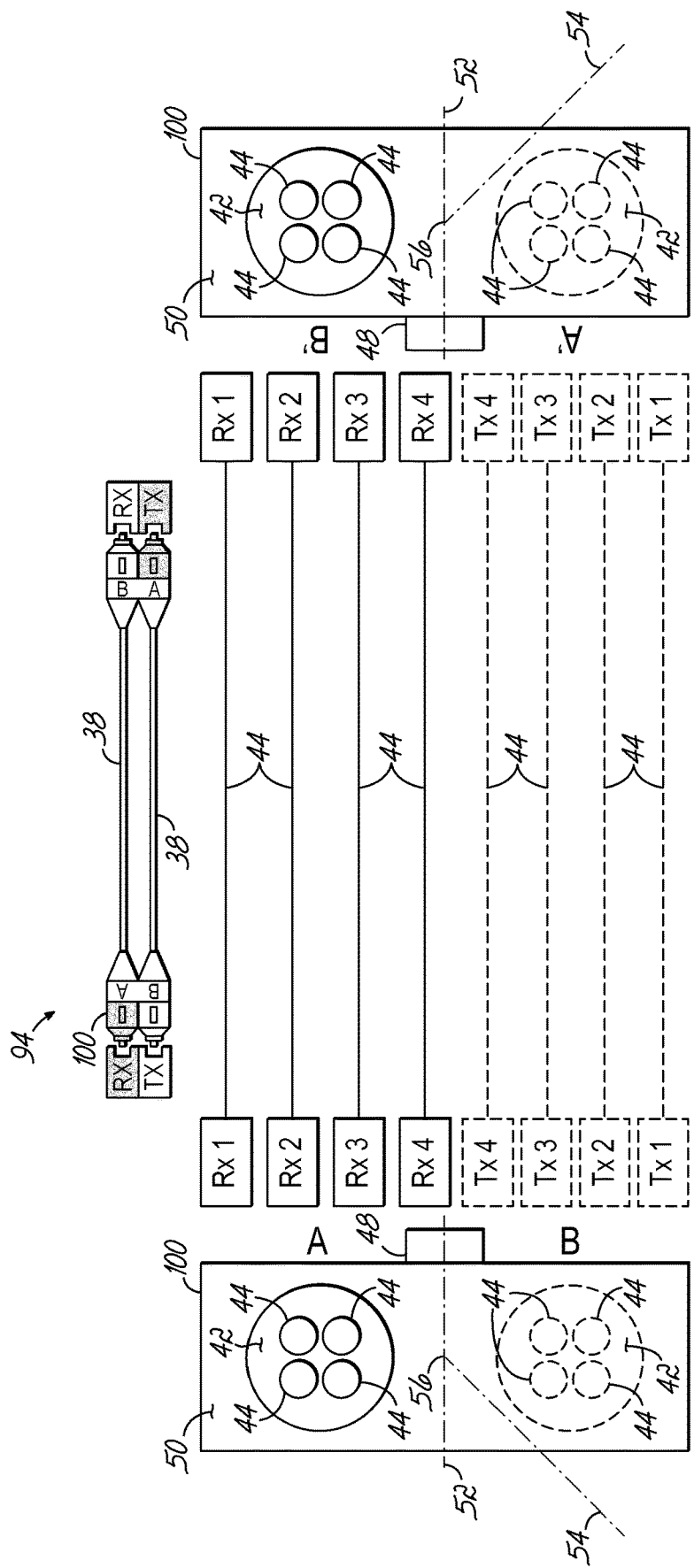
FIG. 13 is a schematic view of a multicore fiber optic cable assembly including a plurality of multicore optical fibers each having a front end face and a back end face.

FIG. 13 depicts an exemplary multicore duplex patch cord 94 that includes a plurality of multicore optical fibers 38 (e.g., two multicore optical fibers 38) in a duplex arrangement. Each exemplary multicore optical fiber 38 includes a plurality of cores 44 (e.g., four cores in a 2×2 configuration) within a common cladding. Each end face 42 of each multicore optical fiber 38 is operatively coupled to a respective cable connector 100 including the alignment key 48. The cable connectors 100 are configured so that each core 44 can receive one or more optical signals from a port connector (e.g., branch connector 98) at one end of the multicore optical fiber 38 (generally referred to as the "B" end), and convey the one or more received optical signals to another port connector at the other end of the multicore optical fiber 38 (generally referred to as the "A" end).

The multicore duplex patch cord 94 may have an outward appearance similar to a standard A-to-B duplex patch cord. However, unlike a standard duplex patch cord that uses single core optical fibers, the multicore A-to-B duplex patch cord 94 is configured to maintain the core polarity of each multicore optical fiber 38 to avoid routing optical signals to the wrong destination. Maintaining core polarity enables each transmitter/receiver channel from one transceiver to be operatively coupled to its respective receiver/transmitter channel in the other transceiver. To this end, and as described in more detail below, the cable connectors 100 at each end of the multicore A-to-B duplex patch cord 94 and port connectors of the transceiver are configured to have a commonly defined multicore connector interface 50.

The cable connectors 100 may be characterized in that the end face core patterns are arranged to collectively define a pattern of cores 44 at the connector interface 50 which has mirror-image symmetry, i.e., symmetry about the interface axis of symmetry 52. In the depicted embodiment, the interface axis of symmetry 52 is colinear with the key-axis 45. However, in alternative embodiments (such as described below), the interface axis of symmetry 52 may be, for example, orthogonal to the key-axis 45. Thus, embodiments are not limited to connectors in which the interface axis of symmetry 52 is aligned with the key-axis 45.

By virtue of the opposing draw directions and symmetric positioning of the end faces 42 with respect to the interface axis of symmetry 52, the connector core patterns in both the branch connectors 98 and the cable connectors 100 have mirror-image symmetry about the interface axis of symmetry 52. As a result of this mirror-image symmetry, the connector core pattern is the same at each end of the multicore duplex patch cord 94 (i.e., the "A" end has the same connector core pattern as the "B" end). This allows the connector core pattern of the branch connectors 98 to be standardized to that of the cable connector 100 so that core polarity matches at both ends of the duplex patch cord 94. Thus, exemplary multicore duplex patch cord 94 is non-directional.

Figure 14:
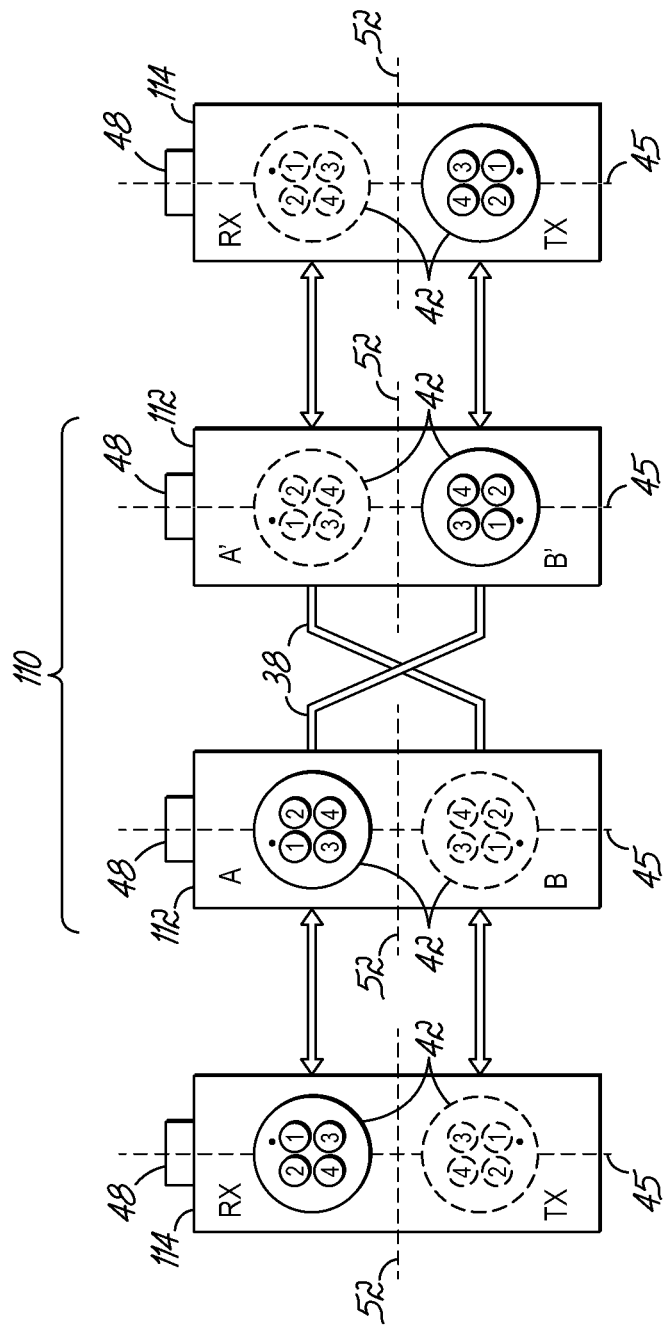
FIG. 14 is a schematic view of an exemplary multicore A-to-B duplex patch cord including two 2×2 multicore optical fibers in an anti-parallel configuration.

FIG. 14 depicts an exemplary multicore A-to-B duplex patch cord 110 including two 2×2 multicore optical fibers 38 in an anti-parallel configuration. The multicore optical fibers 38 are terminated by cable connectors 112, which are depicted as connecting a pair of exemplary transmit/receive port connectors 114. The connectors 112, 114 are configured so that the end faces 42 of multicore optical fibers 38 are centered on a plane that includes the key-axis 45 of the connector 112, 114, i.e., a common plane including the key-axis 45 extends through the end faces 42.

The resulting connector core pattern of connectors 112, 114 has mirror-image symmetry relative to a line of symmetry 52 oriented orthogonally to the key-axis 45 and centered between the multicore optical fibers 38. This line of symmetry 52 is colinear with a cross-axis (not shown) that bisects each connector 112, 114 along a plane perpendicular to the key-axis 45, and is thus orthogonal to the key-axis 45. Connectors that support this type of coplanar arrangement between the optical fibers and alignment key include the aforementioned MDC and SN-type duplex connectors. Accordingly, a duplex MDC or SN interface for a network component, such as a breakout module or a transceiver, can be defined following the connector core patterns depicted in FIG. 14.

Configuring the multicore A-to-B duplex patch cord 110 so that the multicore optical fibers 38 have opposite draw directions, and placing the end faces 42 within the connectors 112, 114 so that the connector core patterns have mirror-image symmetry about the cross-axis, results in each end of the multicore A-to-B duplex patch cord 110 having the same core polarity (i.e., the same connector core pattern). This, in turn, enables connections to port connectors 114 having a consistent configuration without concerns regarding the direction of the patch cord 110.

Figure 15:
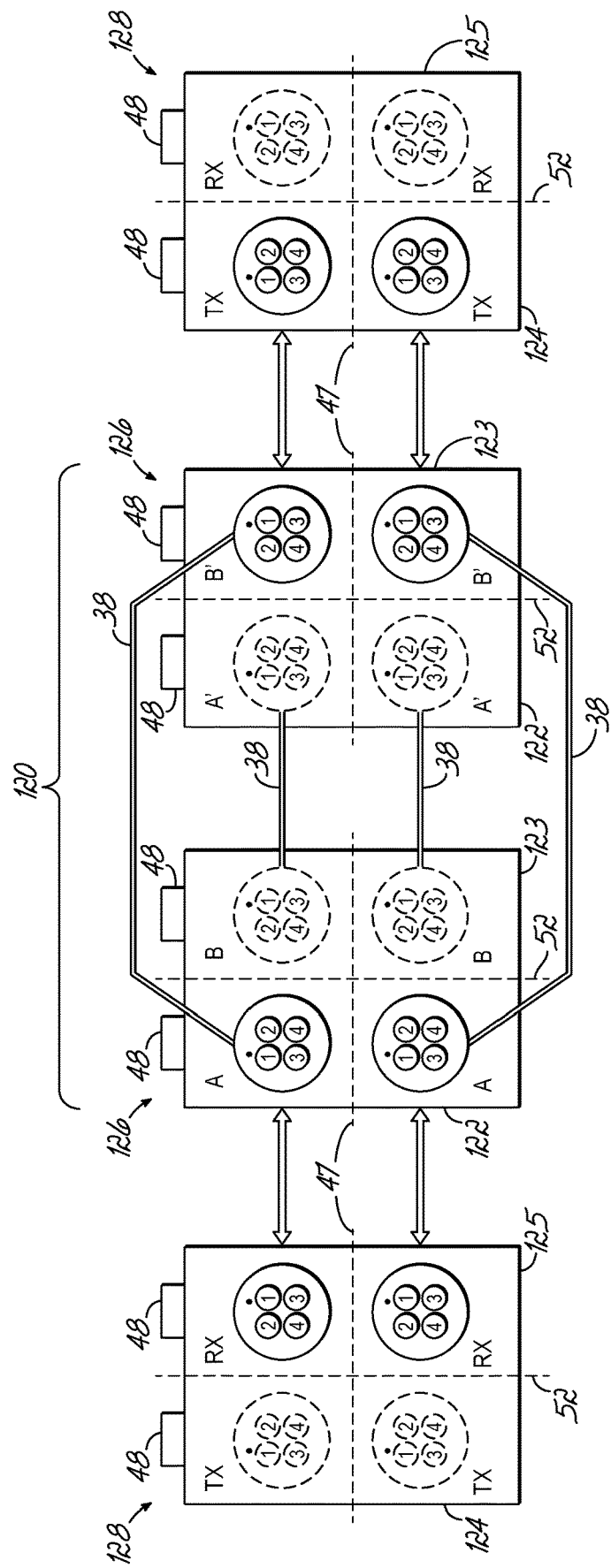
FIG. 15 is a schematic view of an exemplary multicore A-to-B duplex patch cord including two of the duplex patch chords from FIG. 13 with connectors ganged together to form a quadruplex cable connector.

FIG. 15 depicts another exemplary multicore A-to-B duplex patch cord 120 including four 2×2 multicore optical fibers 38 in an anti-parallel configuration. At each end of the patch cord 120, the multicore optical fibers 38 are terminated in one of two cable connectors 122, 123 (e.g., VSFF dual-ferrule connectors) that are ganged together to form a quadruplex cable connector 126. The patch cord 120 is depicted as connecting a pair of transmit/receive quadruplex port connectors 128 each comprising a similarly ganged pair of port connectors 124, 125. The connector core pattern of each quadruplex connector 126, 128 has mirror-image symmetry about an interface axis of symmetry 52 that bisects the quadruplex connector 126, 128. The interface axis of symmetry 52 is considered as aligned with the alignment keys 48 of connectors 122-125 (as opposed to orthogonal to the alignment keys 48) because the interface axis of symmetry 52 is parallel to the key-axes 45 (not depicted) of the ganged connectors 122-125. Advantageously, a quadruplex multicore fiber connector may provide an attractive solution for transceivers having eight lanes.

Figure 16:
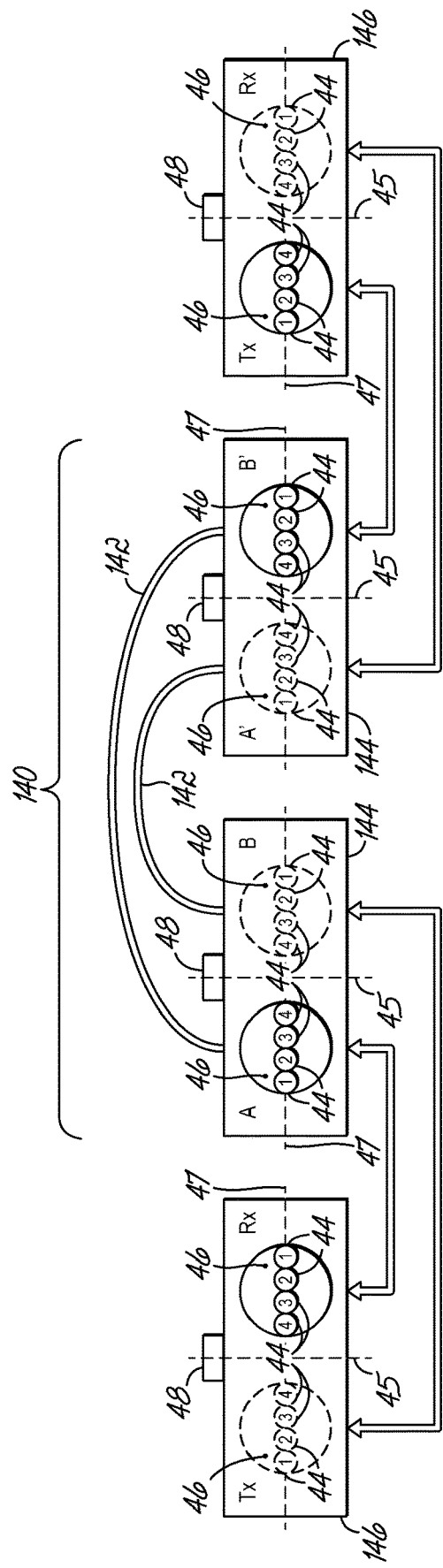
FIGS. 16-18 are schematic views of exemplary multicore A-to-B duplex patch cords each including two 1×4 multicore optical fibers in an anti-parallel configuration.

FIG. 16 depicts another exemplary multicore A-to-B duplex patch cord 140 including two 1×4 multicore optical fibers 142 in an anti-parallel configuration. At each end of the patch cord 140, the optical fibers 142 are terminated by a cable connector 144 which is depicted as connecting the patch cord 140 to exemplary transmit/receive port connectors 146. The connectors 144, 146 are configured to place each optical fiber 142 so that the cores 44 of the optical fibers 142 are aligned with the cross-axis 47 of the respective cable connector 144. The cores 44 of each multicore optical fiber 142 are thus colinearly aligned with the cores 44 of the other optical fiber 142 terminated by the same connector 144, 146. This core placement results in each connector core pattern having mirror-image symmetry about the key-axis 45 of the connector 144, 146 in question.

Figure 17:
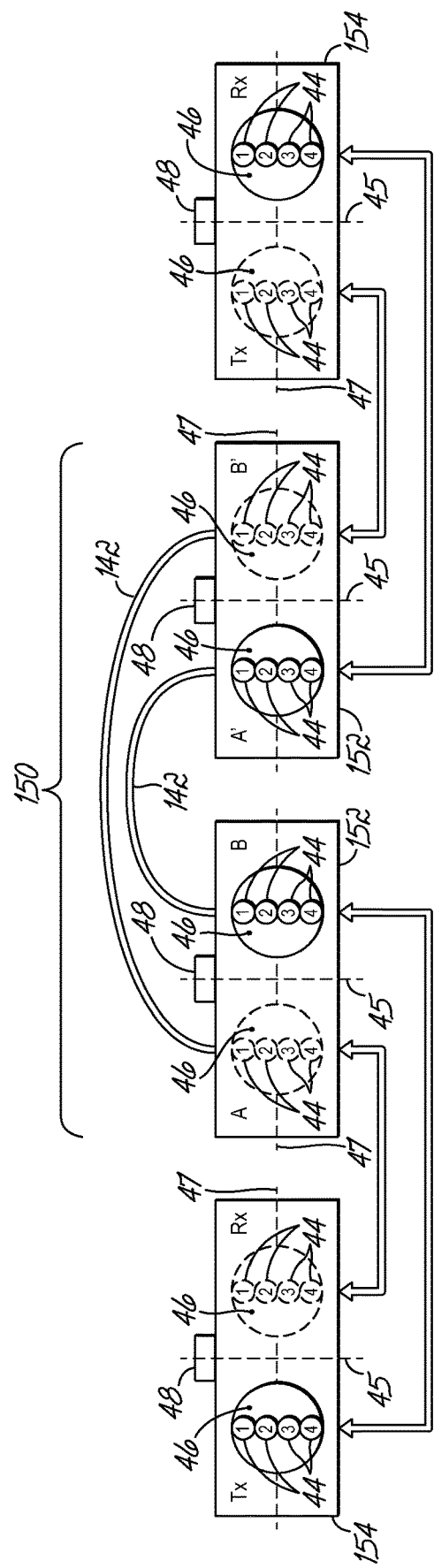

FIG. 17 depicts another exemplary multicore A-to-B duplex patch cord 150 including two 1×4 multicore optical fibers 142 having an anti-parallel configuration. At each end of the patch cord 150, the optical fibers 142 are terminated by a cable connector 152 which is depicted as connecting the patch cord 150 to exemplary transmit/receive port connectors 154. The connectors 152, 154 are configured to place each optical fiber 142 so that the cores 44 of the optical fibers 142 are parallel to the key-axis 45 of the respective connector 152, 154. This core placement results in each connector core pattern having mirror-image symmetry about the key-axis 45 of the connector 152, 154 in question.

Figure 18:
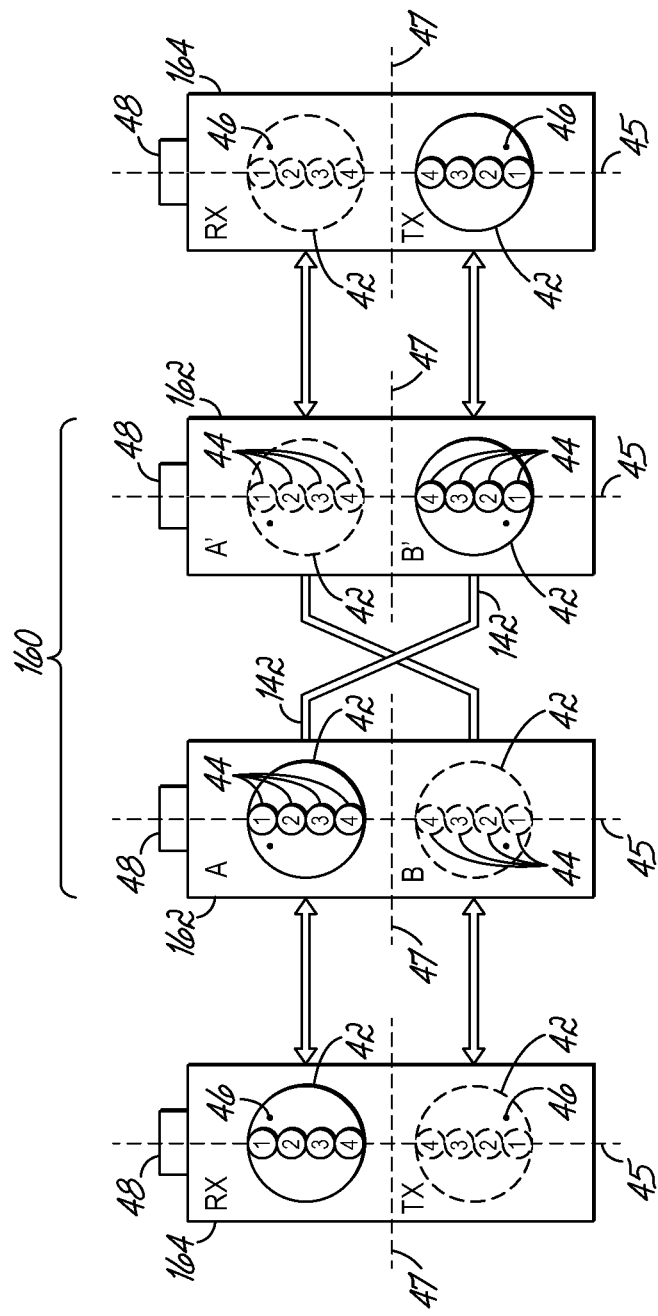

FIG. 18 depicts another exemplary multicore A-to-B duplex patch cord 160 including two 1×4 multicore optical fibers 142 having an anti-parallel configuration. At each end of the patch cord 160, the optical fibers 142 are terminated by a cable connector 162 which is depicted as connecting the patch cord 160 to exemplary transmit/receive port connectors 164. The connectors 162, 164 are configured to place the end face 42 of each optical fiber 142 so that the cores 44 of the optical fibers 142 are aligned with the key-axis 45 of the respective cable connector 144. This core placement results in each connector core pattern having mirror-image symmetry about the key-axis 45 of the connector 162, 164 in question. The optical fibers 142 are oriented within their respective connectors 162, 164 so that the connector core pattern also has mirror-image symmetry about the cross-axis 47 of the connector 162, 164.

The mirror-image symmetry of the end face core pattern of a multicore optical fiber having a 1×n core configuration may be utilized to provide more functions than other types of multicore optical fiber. For example, a 1×4 multicore optical fiber can be used directly for chip connectivity, thereby eliminating the need for fan-in/fan-out devices. However, relatively tight core spacing may cause the outer cores to be subject to higher attenuation as compared to other core configurations. Cross talk may also be higher than in 2×2 multicore optical fiber. Because 1×n multicore optical fibers can have end face core patterns with mirror-image symmetry, a single multicore optical fiber can provide two-way connectivity, and does not require end face core patterning that varies with fiber direction. By way of illustration, the following examples of multicore duplex patch cords including 1×n multicore optical fibers are depicted with an anti-parallel fiber layout. However, it should be recognized that due to the non-directional nature of 1×n multicore optical fibers, the depicted designs may also be implemented using parallel multicore optical fiber configurations.

Occasionally, the receive/transmit polarity of a fiber optic link may need to be reversed. The need to reverse receive/transmit polarity may occur, for example, if the signals are being routed between equipment having different connector polarities. In these cases, A-to-A duplex patch cords, sometimes referred to as cross-over patch cords, may be used. The optical fibers in A-to-A duplex patch cords are "crossed" so that the optical fiber polarity is reversed by the cable. As described below, 1×n multicore optical fibers may be used to avoid disrupting core polarity when reversing optical fiber polarity in a multicore A-to-A duplex patch cord.

Figure 19:
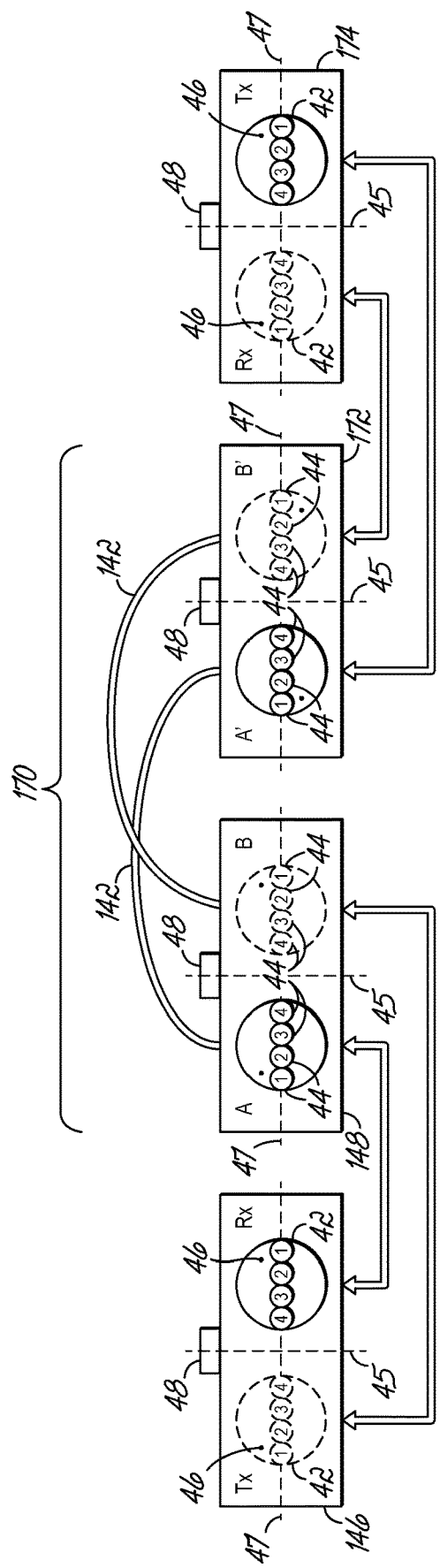
FIGS. 19-21 are schematic views of exemplary multicore A-to-A duplex patch cords each corresponding to a respective multicore A-to-B duplex patch cord of a respective one of FIGS. 16-18.
Figure 20:
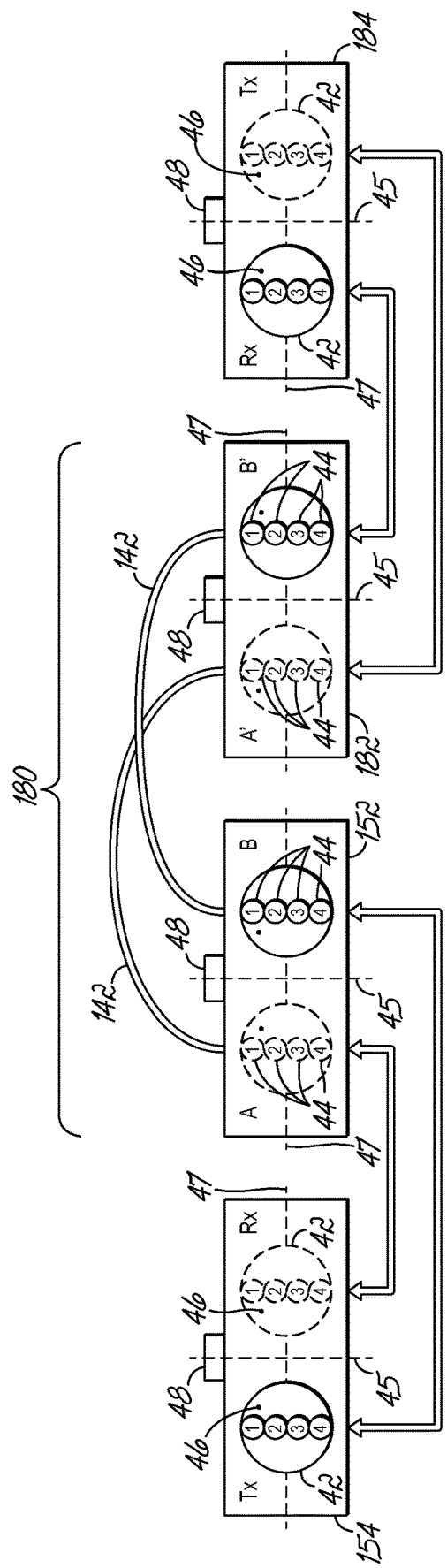
Figure 21:
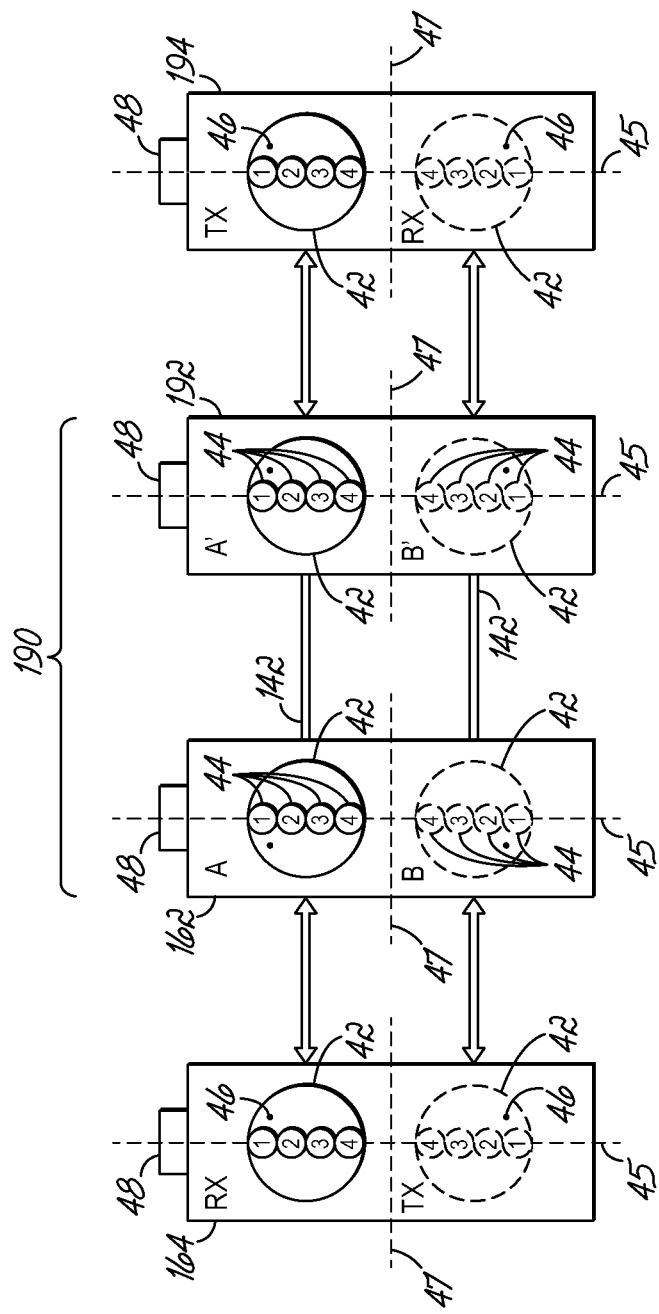

FIGS. 19-21 depict exemplary multicore A-to-A duplex patch cords 170, 180, 190 each corresponding to a respective multicore A-to-B duplex patch cord 140, 150, 160 depicted in FIGS. 16-18. The components of the A-to-A duplex patch cords 170, 180, 190 have the same configuration as those of their counterpart A-to-B duplex patch cords 140, 150, 160 except for cable connectors 172, 182, 192, and port connectors 174, 184, 194 on the reversed-polarity end of the patch cords 170, 180, 190.

When the connector topologies of A-to-B duplex patch cords 140, 150, 160 of FIGS. 16-18 are adapted to the A-to-A duplex patch cords 170, 180, 190 of FIGS. 19-21, core polarity is maintained. This ability to maintain core polarity in both the A-to-A duplex patch cores 170, 180, 190 and the A-to-B duplex patch cords 140, 150, 160 may be attributed to the core pattern of each individual optical fiber 142 having mirror-image symmetry about the direction of the key-axis 45 for each of the duplex patch cords 150, 140, 160, 170, 180, 190. That is, the optical fibers 142 are oriented and positioned within each connector of the duplex patch cords so that the core pattern of each optical fiber 142 has mirror-image symmetry about a line of symmetry parallel to the key-axis 45. Although the marker 46 provides an indication of the mirror-image reversal of the fiber end faces, the core patterns themselves are unchanged by this reversal. Thus, the configurations depicted by FIGS. 16-21 support both straight-though and cross-over connectivity in duplex patch cords.

The 1×4 multicore optical fiber may be used, for example, with VSFF dual-ferrule connectors. The connector core pattern of patch cords 140, 170 (FIGS. 16 and 19) and patch cords 160, 190 (FIGS. 18 and 21) has mirror-image symmetry along both the key-axis 45 and cross-axis 47. The mirror-image symmetry along the key-axis 45 of patch cords 140, 170 in FIGS. 16 and 19 is due to the anti-parallel-configuration of the multicore optical fibers 142, while the mirror-image symmetry along the cross-axis 47 of patch cords 140, 170 is due to the symmetric nature of the core pattern of each optical fiber 142. In contrast, the mirror-image symmetry along the key-axis 45 of patch cords 160, 190 in FIGS. 18 and 21 is due to the symmetric nature of the core pattern of each optical fiber 142, while the mirror-image symmetry along the cross-axis 47 of patch cords 160, 190 is due to the anti-parallel-configuration of the multicore optical fibers 142.

In each of FIGS. 16, 18, 19, and 21, a two-dimensional mirror-image symmetry is achieved by combining the individual mirror-image symmetries provided by the anti-parallel configuration of the cable and the symmetric nature of the core patterns. In the exemplary embodiments, this is achieved by orienting the end faces 42 of the multicore optical fibers 142 in the connector interface 50 so that these mirror-image symmetries are orthogonal to each other. As a result, the cores 44 in the two multicore optical fibers 142 may be modified to switch fiber polarity by simply moving the alignment key 48 of connector 162 to the opposite side of the connector housing.

Figure 22:
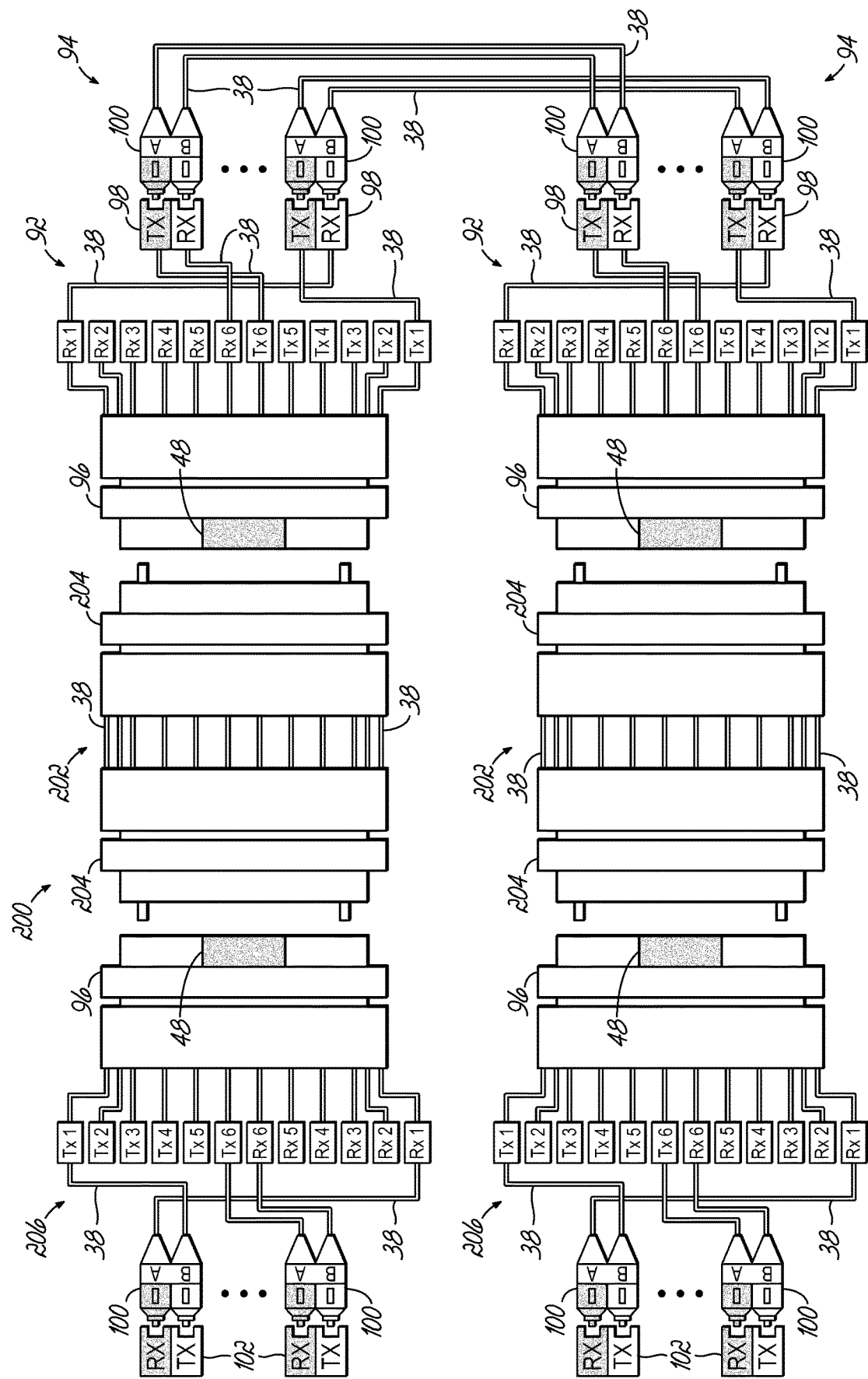
FIG. 22 is a schematic view of an exemplary structured multicore fiber optic cabling system that provides multicore optical fiber duplex connectivity with a cross connect structured cabling.

FIG. 22 depicts an exemplary structured multicore fiber optic cabling system 200 that provides multicore optical fiber duplex connectivity with cross-connect structured cabling. The cabling system 200 includes a plurality of two-way multicore fiber optic cable assemblies 202 (e.g., two trunk cables) each including a plurality of multicore optical fibers 38 (e.g., 12 multicore optical fibers) terminated by trunk cable connectors 204 in a key-down orientation. One trunk connector 204 of each cable assembly 202 is operatively coupled to a trunk port connector 96 of a respective breakout module 206 (e.g., a fan-in/fan-out module) in a key-up orientation. The exemplary breakout module 206 includes a trunk port connector 96 having a key-up orientation. The trunk port connector 96 is operatively coupled to a plurality of branch connectors 208 (e.g., six branch connectors) by paired multicore optical fibers 38 having a duplex configuration. Each branch connector 208 is shown as being operatively coupled to a respective port connector 102, e.g., a transceiver port connector.

Each of the other trunk cable connectors 204 of trunk cables 202 are operatively coupled to a trunk port connector 96 of a respective breakout module 92 (e.g., breakout cassettes) in a key-up orientation by multicore duplex patch cords 94 in a cross-connect configuration. This results in a cross connected structured cabling system 200 with multicore optical fiber duplex connectivity. The structured cabling system of FIG. 22 shows that a duplex cross connect structured cabling configuration is possible using two-way multicore fiber optic cable assemblies (e.g., trunk cables terminated with MPO connectors) and multicore duplex patch cords.

Figure 23:
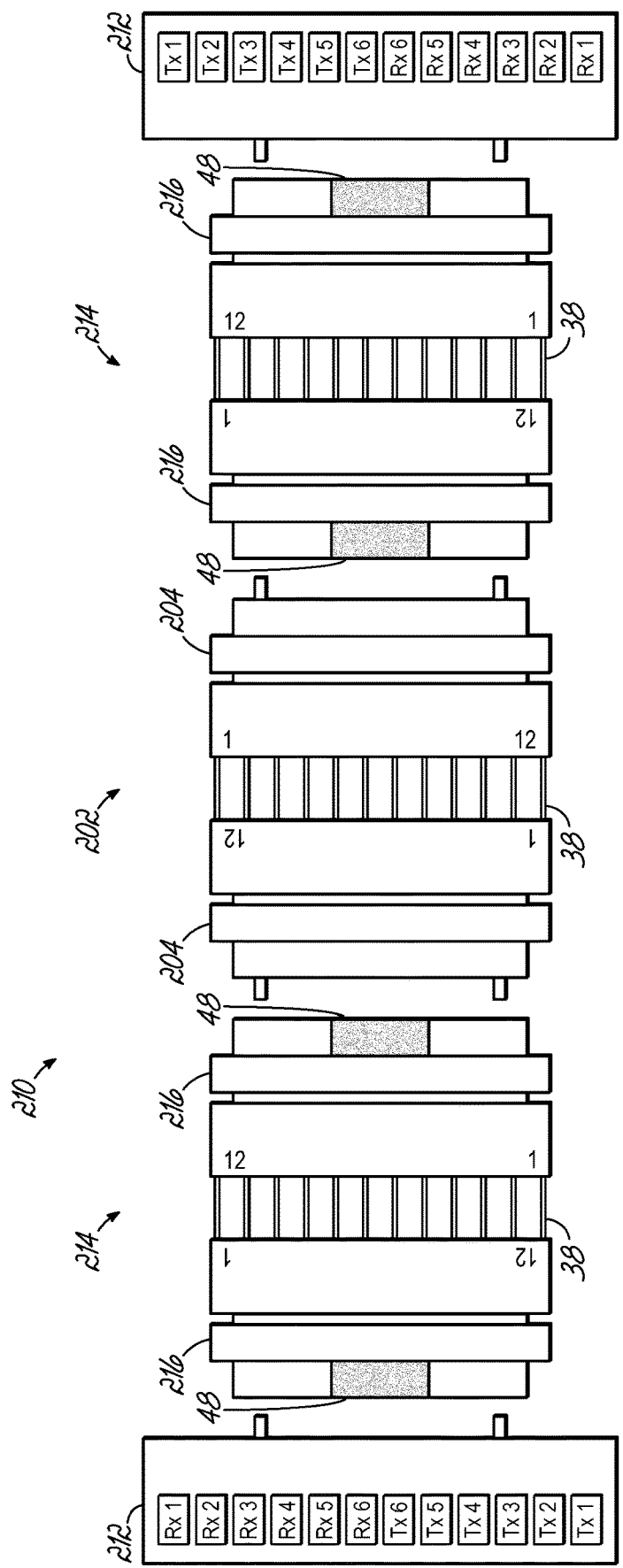
FIG. 23 is a schematic view of an exemplary structured multicore fiber optic cabling system that includes a two-way multicore fiber optic trunk cable in a key-down orientation.

FIG. 23 depicts an exemplary structured multicore fiber optic cabling system 210. The cabling system 210 includes a two-way multicore fiber optic trunk cable 202 in a key-down orientation. Each connector 204 of the trunk cable 202 is operatively coupled to a key-down port connector 212 by a two-way multicore optical fiber inter-connect patch cord 214. The port connector 212 may be, for example, associated with a breakout module 92, such as an array fan-in/fan-out device. Each patch cord 214 includes a plurality of multicore optical fibers 38 terminated by a cable connector 216 in a key-up orientation. This results in parallel connectivity between network node connectors 216, i.e., RX1 is operatively coupled to TX1, RX2 is operatively coupled to TX2, etc. FIG. 23 demonstrates that two key-up to key-up multicore optical fiber patch cords terminated in MPO connectors having the core polarities depicted in FIG. 9 can provide parallel connectivity while maintaining consistent core polarities.

Figure 24A:
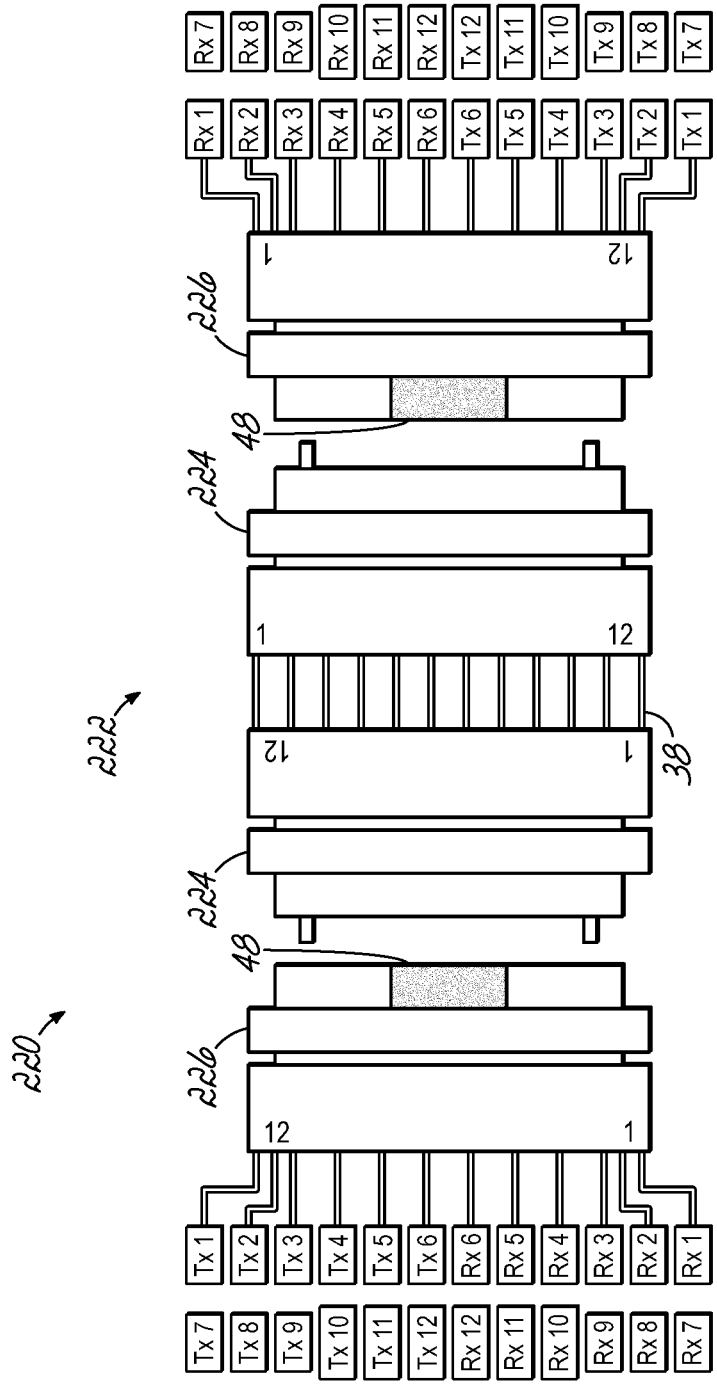
FIGS. 24A and 24B are schematic views of an exemplary structured multicore fiber optic cabling system including a two-way multicore fiber optic cable assembly in a key-down orientation.
Figure 24B:
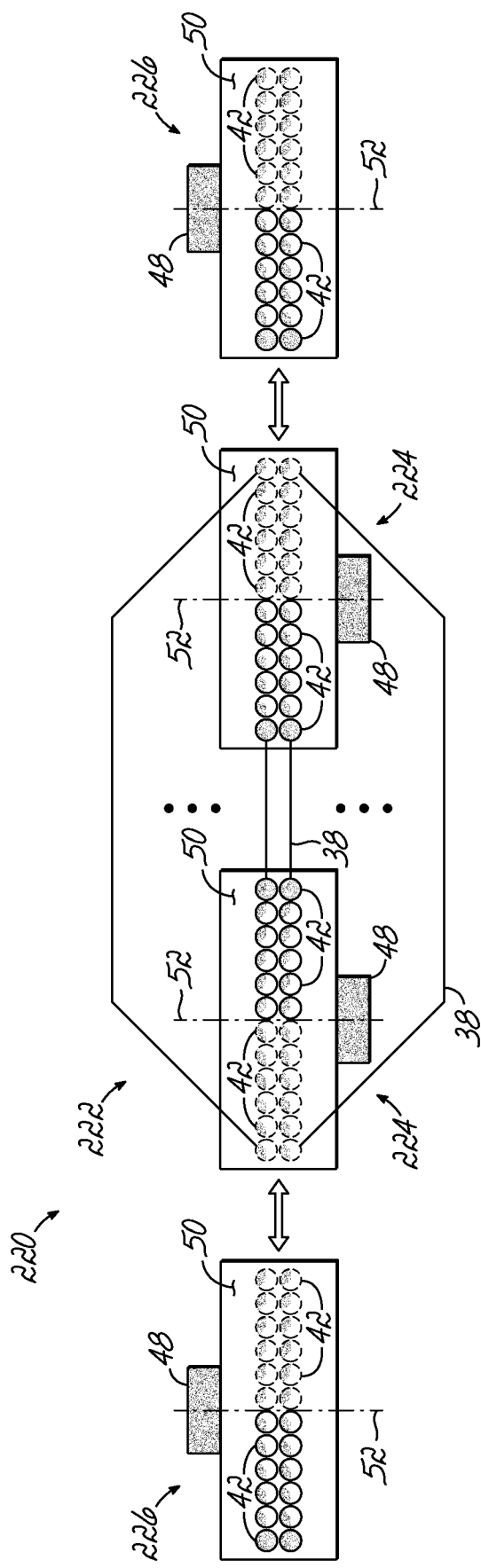

FIGS. 24A and 24B depict an exemplary structured multicore fiber optic cabling system 220 including a two-way multicore fiber optic cable assembly 222 in a key-down orientation. Each connector 224 of the fiber optic cable assembly 222 includes a plurality of end faces 42 (e.g., 24 end faces 42) arranged in two linear arrays each having an equal number of end faces 42 (e.g., 12 end faces 42). The resulting two-row core pattern is essentially two core patterns of the cable connector 76 depicted in FIG. 9 stacked in a parallel arrangement. This configuration of end faces 42 preserves mirror-image symmetry about the interface axis of symmetry 52 of connector 224. Each cable connector 224 may be coupled to a key-up port connector 226 having a reciprocal arrangement of end faces 42, and the fiber row sequence changes between key-up and key-down connectors. The structured multicore fiber optic cabling system of FIGS. 24A and 24B may be scalable to MPO cable connectors having multiple rows, and illustrates the use of two-row 24-fiber MPO connectors for both trunk cables and breakout modules. Breakout modules may be similarly wired according to the transceiver pattern.

Figure 25A:
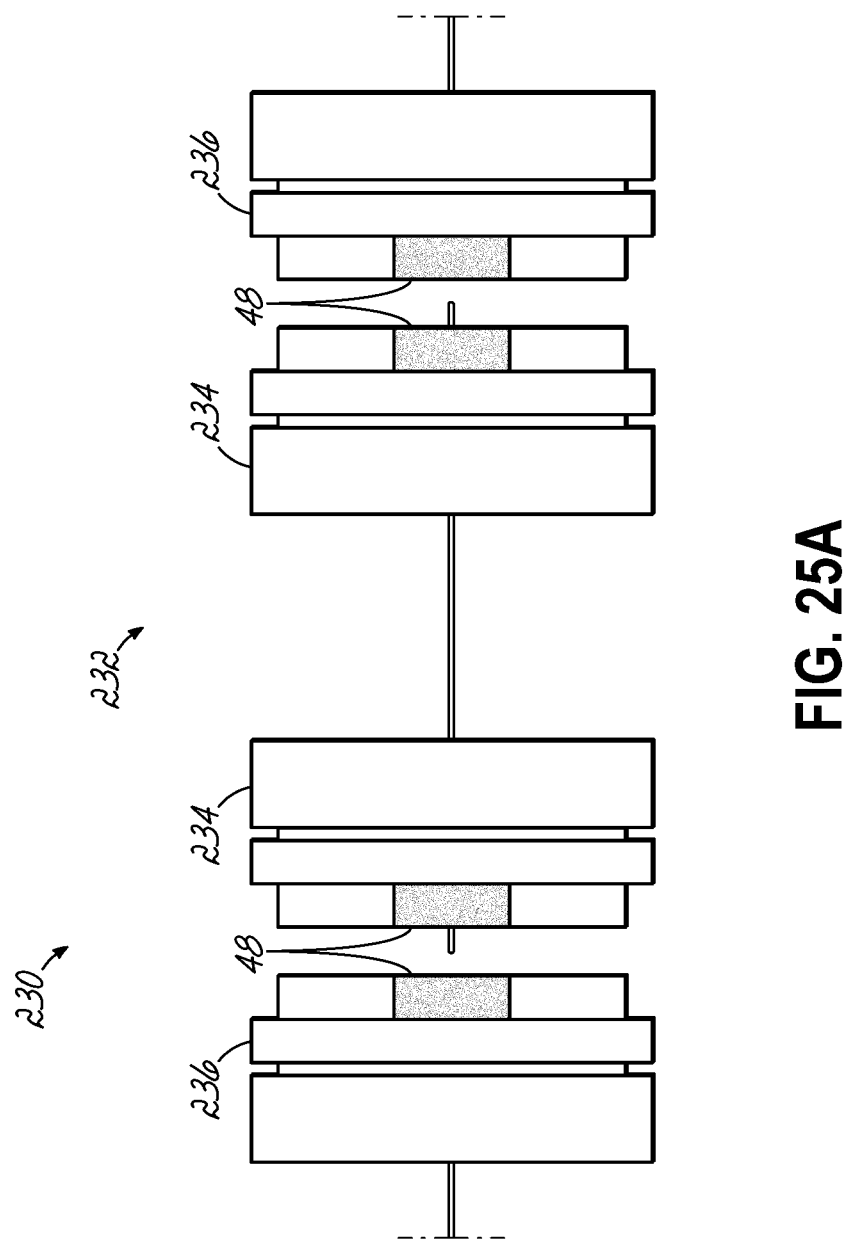
FIGS. 25A and 25B are schematic views of an exemplary structured multicore fiber optic cabling system including a two-way multicore fiber optic cable in a key-up orientation suitable for use with VSFF array connectors.
Figure 25B:
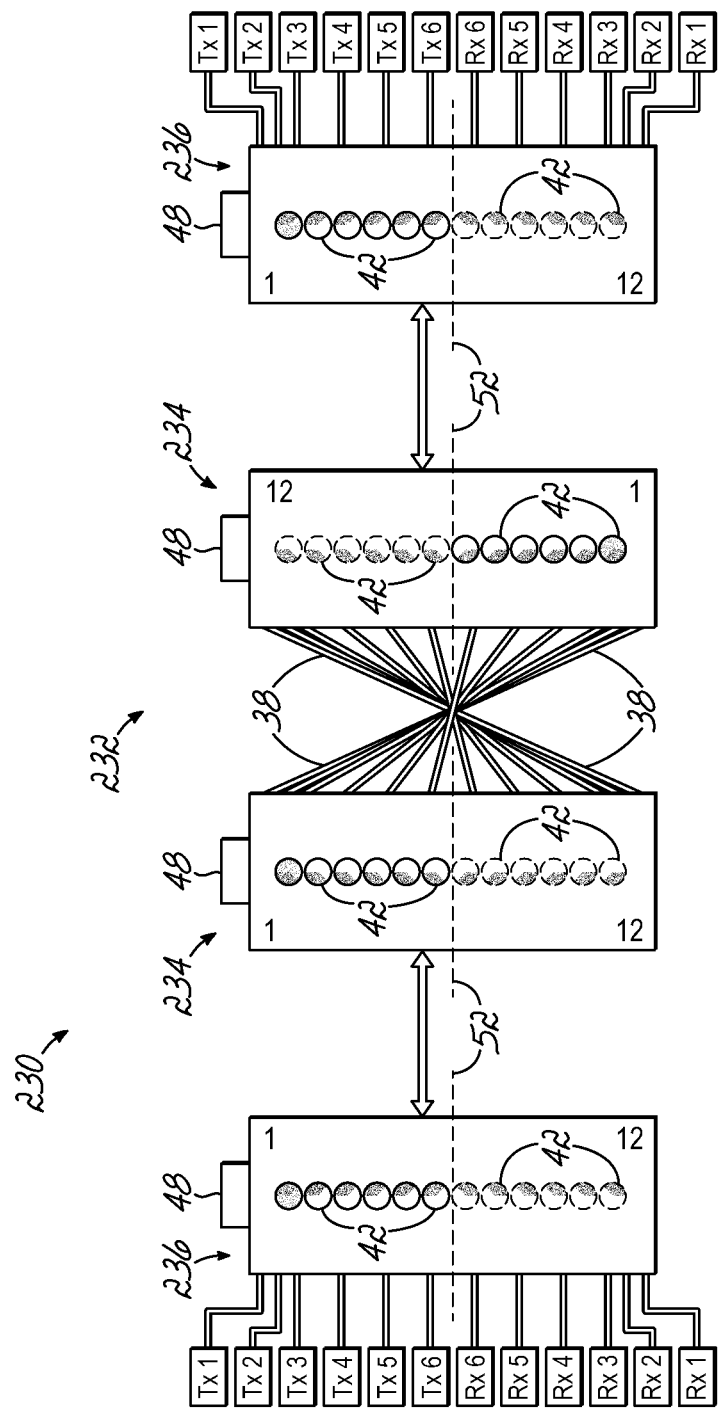

FIGS. 25A and 25B depict an exemplary structured multicore fiber optic cabling system 230 including a two-way multicore fiber optic cable 232 in a key-up orientation suitable for use with VSFF array connectors. Each connector 234 of the multicore fiber optic cable 232 includes a plurality of end faces 42 (e.g., 12 end faces 42) arranged in a linear array. This configuration of end faces 42 preserves mirror-image symmetry about the interface axis of symmetry 52 of connector 234. Each cable connector 234 may be coupled to a key-up port connector 226 having a reciprocal arrangement of end faces 42, such as a VSFF array connector. The structured multicore fiber optic cabling system 230 provides a TIA-568 method-B equivalent for column connectors. The fiber sequence of the multicore fiber optic cable 232 is flipped in the right connector 234, which enables the core polarities to align between both ends of the cable 232. The port connectors 236 also have the same core polarities, which are complementary to the polarities of the cable connector 234. If the ferrule has two columns of fibers, or two column connectors are grouped together to form a two-column connector, the cable configuration of FIGS. 25A and 25B may be scaled to define multi-column connectors.

Figure 26A:
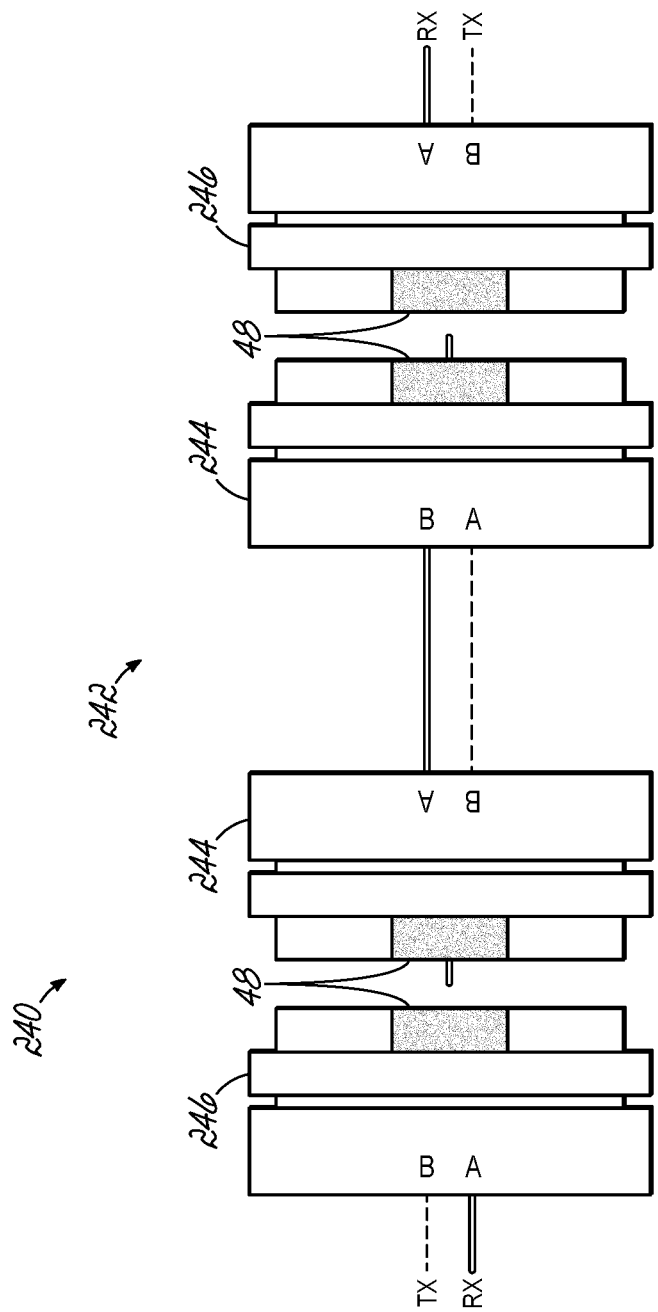
FIGS. 26A and 26B are schematic views of an exemplary structured multicore fiber optic cabling system including a two-way multicore fiber optic cable in a key-up orientation suitable for use with MPO multi-fiber connectors.
Figure 26B:
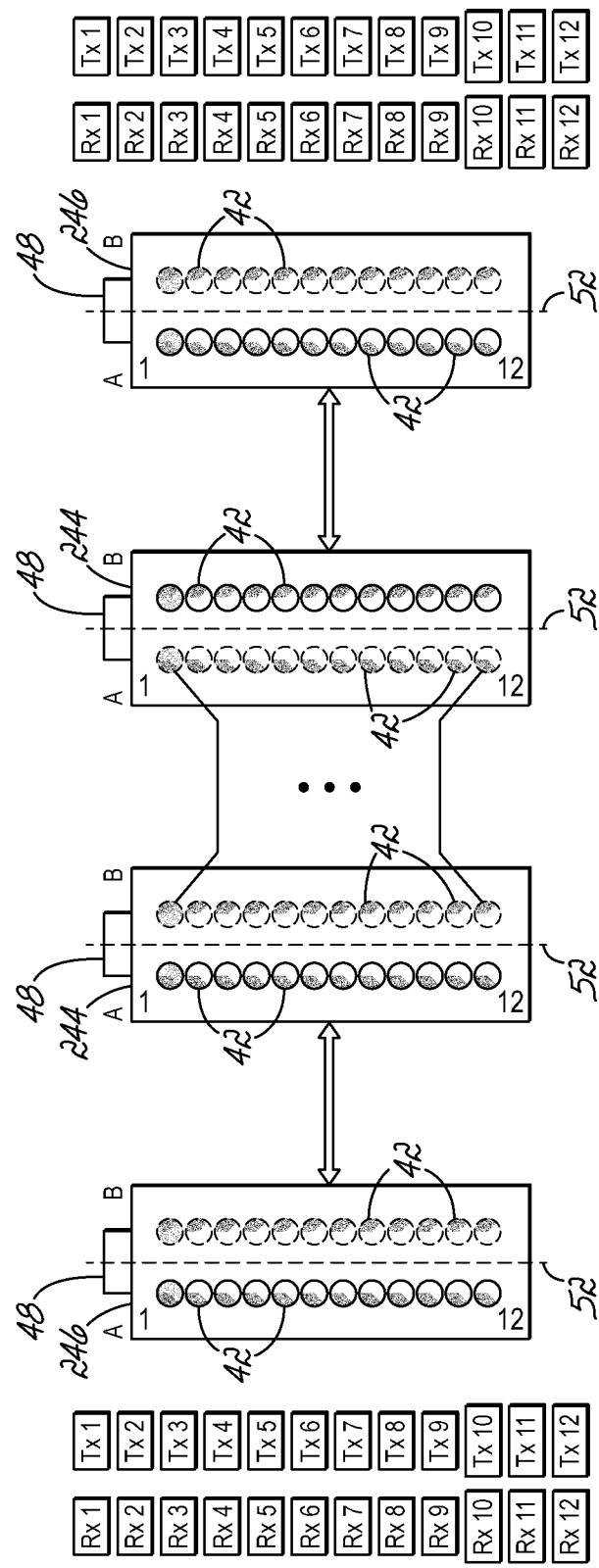

FIGS. 26A and 26B depict an exemplary structured multicore fiber optic cabling system 240 including a two-way multicore fiber optic cable 242 in a key-up orientation suitable for use with MPO multi-fiber connectors. Each connector 244 of cable 242 includes a plurality of end faces 42 (e.g., 24 end faces 42) arranged in two linear arrays each having an equal number of end faces 42 (e.g., 12 end faces 42) parallelly aligned with the key-axis of cable connector 244. The resulting two-column end face pattern may have one linear array designated for transmitters and the other linear array designated for receivers. Configuring the multicore optical fibers 38 associated with one array as anti-parallel to those associated with the other array produces a mirror-image symmetry about an interface axis of symmetry 52 which is colinear with the key-axis. The resulting connector core pattern is similar to that which would be produced by stacking a plurality of the connector interfaces 50 of FIG. 13 along their key axes. Each cable connector 244 may be coupled to an up-key port connector 246 having a reciprocal arrangement of end faces 42. A transceiver polarity flip is achieved which is similar to that of a duplex A-to-B patch cord.

Figure 27A:
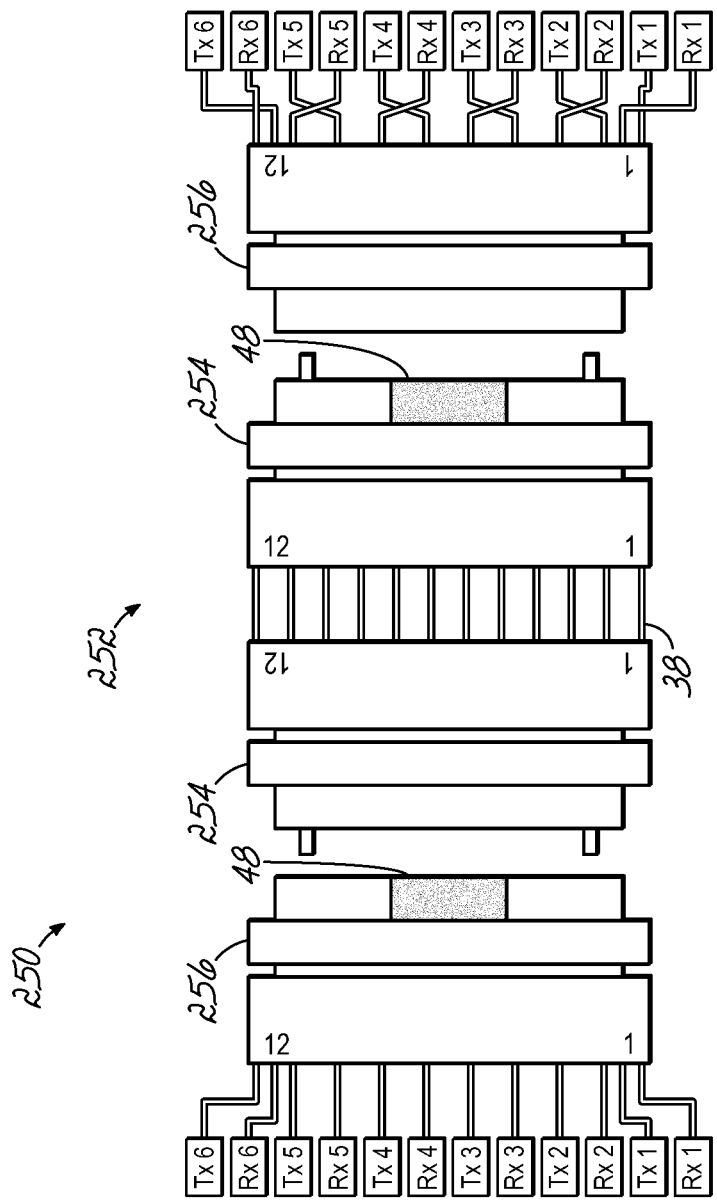
FIGS. 27A and 27B are schematic views of an exemplary structured multicore fiber optic cabling system suitable for use with VSFF array connectors having connector fiber polarities based on TIA-568 Method-A.
Figure 27B:
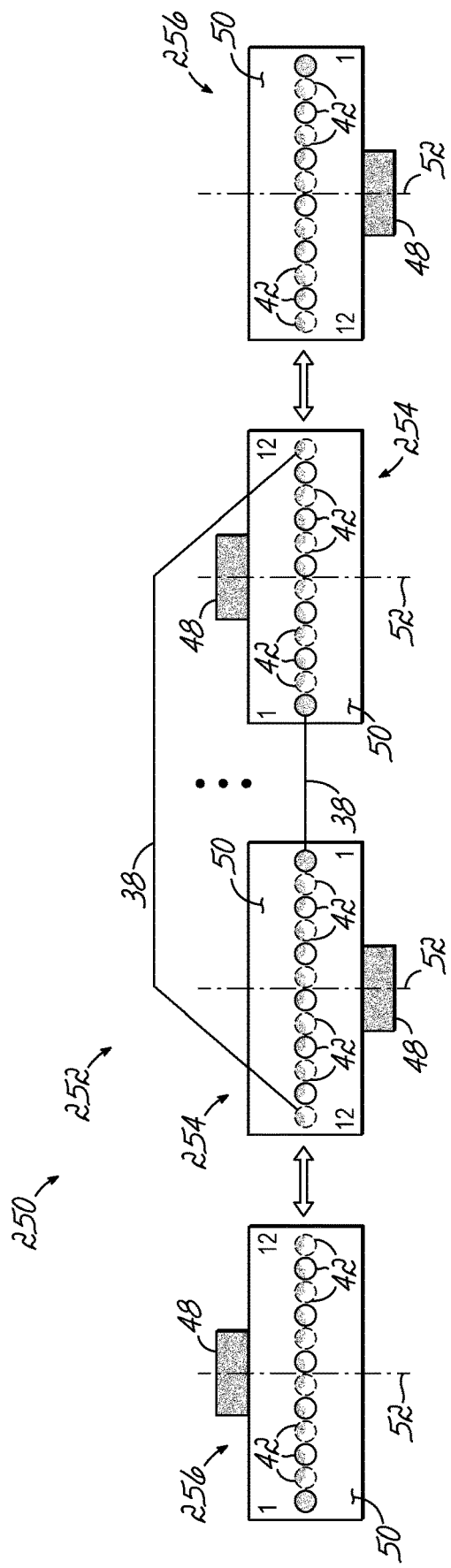

FIGS. 27A and 27B depict an exemplary structured multicore fiber optic cabling system 250 suitable for use with VSFF array connectors having connector fiber polarities based on TIA-568 Method-A. In TIA-568 method-A, the trunk cable is terminated in key-up to key-down configuration and reverse fiber polarity duplex patch cords are used at one side of the trunk cable. Here, the structured multicore fiber optic cabling system 250 includes a two-way multicore fiber optic cable 252 having one cable connector 254 in the key-up orientation and the other cable connector 254 in the key-down orientation. Each cable connector 254 of cable 252 includes a plurality of end faces 42 (e.g., 12 end faces 42) arranged in a linear array generally orthogonal to the key-axis of the cable connector 254. The multicore optical fibers 38 of multicore fiber optic cable 252 have alternating draw directions, and may be referred to as a Type-A multicore optical fiber ribbon.

The resulting connector core pattern has mirror-image symmetry about an interface axis of symmetry 52 that is colinear with the key-axis of its respective connectors. Each cable connector 254 may be coupled to a port connector 256 having a reciprocal arrangement of end faces 42. One of the port connectors 256 (e.g., the right side port connector 256) may have a cross-connect configuration that swaps the positions of the multicore optical fibers in each duplex (transmit and receive) pair.

The connector core pattern of each connector interface 50 in FIGS. 27A and 27B has horizontal mirror-image symmetry, and core polarities are preserved through the link. Each interface includes one key-up and one key-down connector. However, the port connectors 256 at each end of the multicore fiber optic cable 252 have different key orientations. Thus, they match to a specific end of the multicore fiber optic cable 252. The structured multicore fiber optic cabling system 250 also requires two types of duplex patch cords. Accordingly, structured multicore fiber optic cabling systems based on TIA-568 Method-B may be preferred over those based on TIA-586 Method-A. A breakout module 92 suitable for use with the structured multicore fiber optic cabling system 250 of FIGS. 27A-27B is depicted in FIG. 12. The other side of this breakout module 92 may use a reverse fiber polarity A-A type duplex patch cord.

Figure 28A:
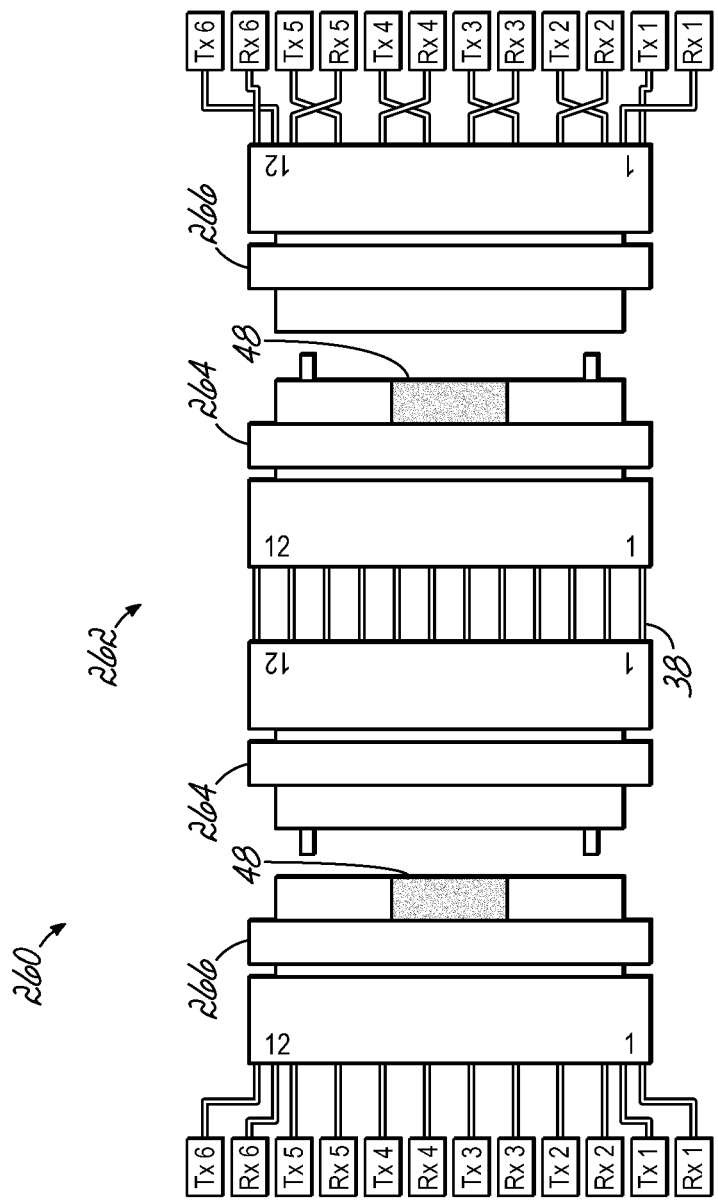
FIGS. 28A and 28B are schematic views of an exemplary structured multicore fiber optic cabling system suitable for use with a multicore fiber optic trunk cable based on TIA-568 Method-A.
Figure 28B:
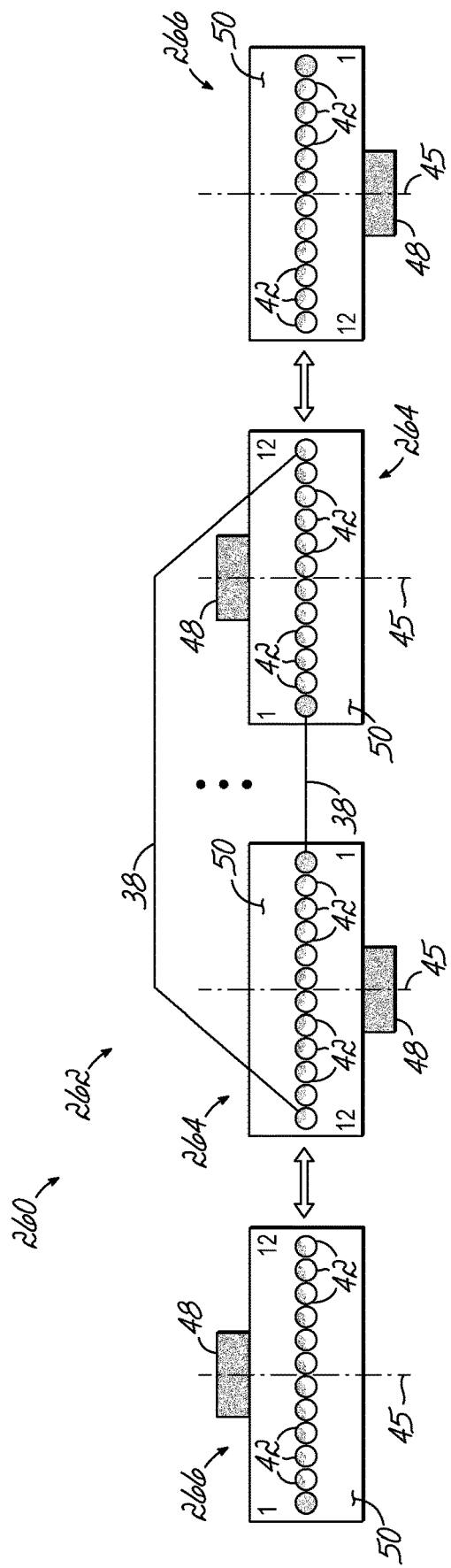

FIGS. 28A and 28B depict an exemplary structured multicore fiber optic cabling system 260 suitable for use with a multicore fiber optic trunk cable based on TIA-568 Method-A. The cabling system 260 includes a two-way multicore fiber optic cable 262 including a plurality of multicore optical fibers each having the same draw direction, one cable connector 264 having a key-up orientation, and another cable connector 264 having a key-down orientation. Each cable connector 264 of cable 262 includes a plurality of end faces 42 (e.g., 12 end faces 42) arranged in a linear array generally orthogonal to the key-axis 45 of the cable connector 254.

Unlike the multicore fiber optic cable 252 depicted by FIGS. 27A and 27B, each multicore optical fiber 38 of multicore fiber optic cable 262 has the same draw direction. Thus, the core patterns of the connector interfaces 50 of connectors 264, 266 do not have mirror-image symmetry. Each cable connector 264 may be coupled to a port connector 266 having a reciprocal arrangement of end faces 42. One of the port connectors 266 (e.g., the right side port connector 266) may have a cross-connect configuration that swaps the positions of the multicore optical fibers in each duplex pair (transmit and receive) thereof. FIGS. 28A and 28B show that while a parallel multicore optical fiber ribbon can be used for TIA-568 method-A solution, it must be limited to use in cabling systems with one-way connectivity to preserve the core polarities.

Figure 29A:
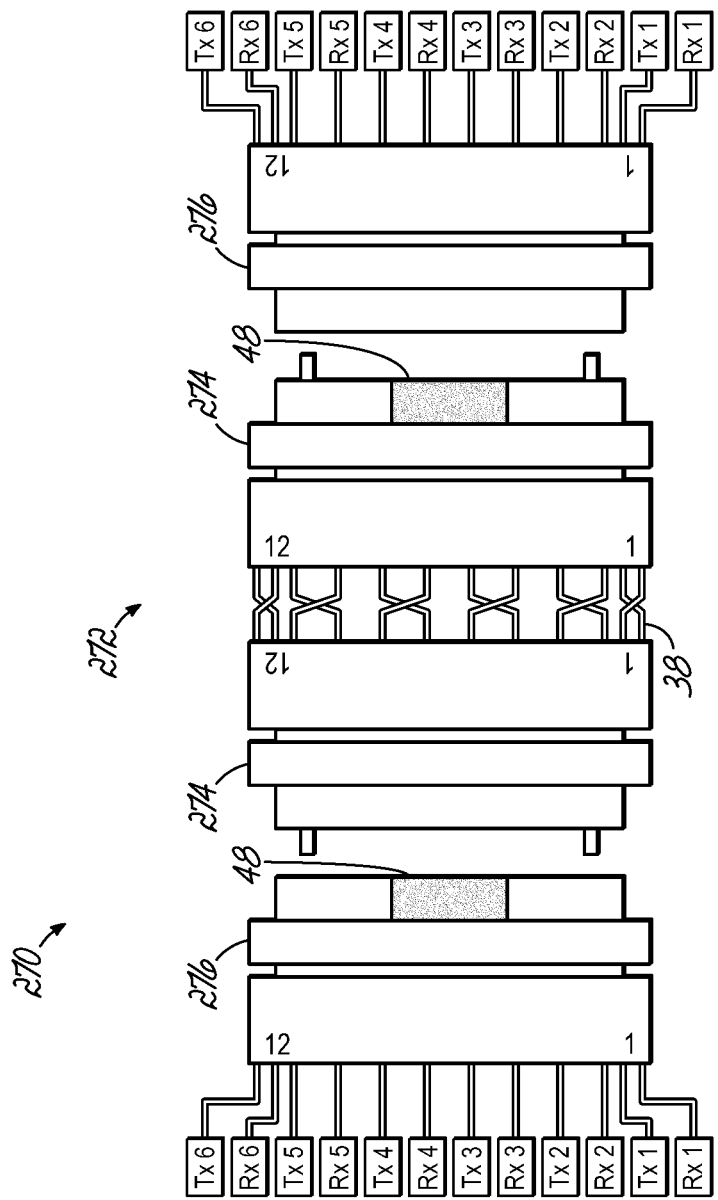
FIGS. 29A and 29B are schematic views of an exemplary structured multicore fiber optic cabling system including a multicore optical fiber based on TIA-586 Method-C in which the trunk cable has pair-wise flipped optical fibers to change the fiber polarity.
Figure 29B:
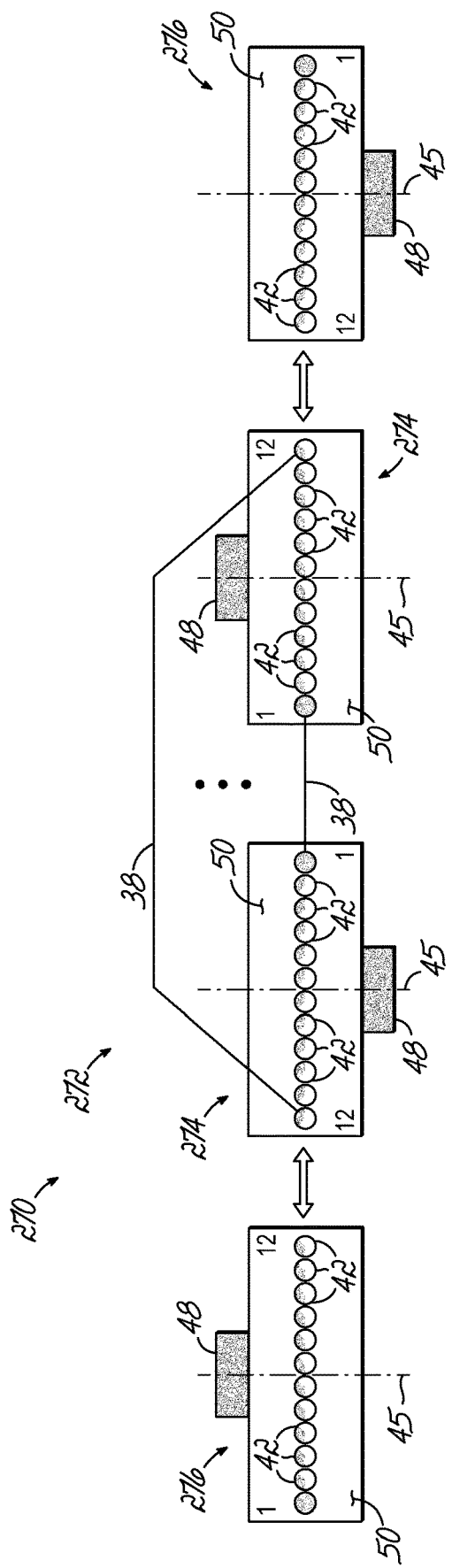

FIGS. 29A and 29B depict a multicore optical fiber based on TIA-586 Method-C in which the trunk cable has pair-wise flipped optical fibers to change the fiber polarity. Due to the symmetry limitation, the connector polarities at both ends of the Type-A direction managed multicore optical fiber ribbon do not match. This limitation may be overcome by using a 1×n connector interface 50 such as depicted in FIG. 7. Fiber core polarities can also be preserved by using Type-B direction managed multicore optical fiber ribbon. However, the benefits of using direction managed multicore optical fiber ribbon may be diminished by the need to use a specific array connector to match to each end of the trunk cable. FIGS. 29A and 29B show that while a parallel multicore optical fiber ribbon can be used for TIA-586 Method-C solution, it may be limited to use in cabling systems with one-way connectivity to preserve the core polarities.

Embodiments of the disclosure include the features of pre-terminated single core fiber optic cabling systems while preserving the multicore optical fiber core polarities throughout the entire link. In comparing TIA-586 Type-B, Type-A, and Type-C trunk cable solutions, a direction managed Type-B multicore optical fiber trunk typically has the lowest number of parts with the most error-proof connectivity and highest flexibility because both the trunk and duplex patch cords are direction-insensitive.

There are many variations in the embodiments within the spirit of this invention. The transceivers in the figures can be multiple channel transceivers or the interfaces of fan-in/fan-out devices. The "key-up" and "key-down" positions can be swapped with the same results. The multicore optical fiber core polarity can take different orientations, as long as the mirror symmetry is satisfied. Because of the significant number of variations, standardizing one scheme helps create an interoperable ecosystem.

The multicore optical fibers may also have other numbers of cores and different core configurations. For example, 8-core optical fibers may be suitable for a next generation 8-lane parallel single mode transceivers. Multicore optical fibers with different numbers of cores may also be used for combining the fibers from Coarse Wavelength Division Multiplexing (CWDM) transceivers. Thus, the use of anti-parallel multicore optical fiber with properly oriented mirror-image symmetry in duplex core patterns may be applied to any type of duplex connector.

It should be further understood that many different core patterns and configurations of multicore optical fibers may be used to produce a connector having a connector core pattern with mirror-image symmetry. Moreover, although the exemplary connectors described above are generally depicted as having 1×2, 2×2, 1×12, and 2×12 connectors for purposes of clarity, aspects of the present disclosure are not limited to this configuration. For example, connectors may be expanded vertically by stacking arrangements of multicore optical fibers similar to those depicted herein, or horizontally by ganging arrangements of multicore optical fibers similar to those depicted herein.

Typically, connectors having mirror-image symmetry will have an even number of multicore optical fibers. However, an odd number of multicore optical fibers may be used if the core pattern of a center fiber itself has mirror-image symmetry. Although the above examples are connectors having between two and twenty four multicore optical fibers, there is no specific limit to the number of multicore optical fibers that can be assembled into a cable assembly. The multicore optical fibers may also have different numbers of cores and cores arranged in different patterns than shown. For example, cores may be arranged in patterns that have radial symmetry or that lack radial symmetry. Reference cores may be indicated by a marker embedded in the multicore optical fiber, or may be indicated by being in an off normal position.

Advantageously, the cost of manufacturing cable assemblies having multicore optical fibers with mirror-image symmetry should not be significantly higher than for conventional fiber optic cable assemblies that have single core optical fibers. The same manufacturing processes may be used to make the cable assemblies despite the different optical fibers (i.e., multicore instead of single core). To form the desired pattern of anti-parallel multicore optical fibers, the end face of the multicore optical fiber on each fiber reel may be inspected to determine the draw direction, e.g., by observing the orientation of the core patterns.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A structured multicore fiber optic cabling system, comprising:
   one or more multicore fiber optic cable assemblies each including:
      a first cable connector including a first cable connector interface,
      a second cable connector including a second cable connector interface, and
      a first plurality of multicore optical fibers each including a first end face having a first end face core pattern and a second end face having a second end face core pattern that is a mirror-image of the first end face core pattern, the first plurality of multicore optical fibers configured so that a first half thereof has a first draw direction and a second half thereof has a second draw direction opposite the first draw direction,
      wherein the first cable connector is configured so that the first end face of each multicore optical fiber having the first draw direction and the second end face of each multicore optical fiber having the second draw direction is placed in the first cable connector interface to define a first connector core pattern having a first mirror-image symmetry, and
      wherein the second cable connector is configured so that the first end face of each multicore optical fiber having the second draw direction and the second end face of each multicore optical fiber having the first draw direction is placed in the second cable connector interface to define the first connector core pattern; and
   a plurality of network components each including a port connector having a port connector interface including a plurality of end faces with a first half thereof having the first end face core pattern and a second half thereof having the second end face core pattern, each end face of the plurality end faces being placed in the port connector interface to define the first connector core pattern,
   wherein core polarity is preserved between a first port connector of a first network component of the plurality of network components and a second port connector of a second network component of the plurality of network components:
      when the first cable connector of a first multicore fiber optic cable assembly of the one or more multicore fiber optic cable assemblies is operatively coupled to the first port connector, and the second cable connector of the first multicore fiber optic cable assembly is operatively coupled to the second port connector, and
      when the first cable connector of the first multicore fiber optic cable assembly is operatively coupled to the second port connector, and the second cable connector of the first multicore fiber optic cable assembly is operatively coupled to the first port connector.

2. The structured multicore fiber optic cabling system of claim 1, wherein:
   the first cable connector includes a first cable alignment key having a first placement relative to the first connector core pattern of the first cable connector, and the second cable connector includes a second cable alignment key having the first placement relative to the first connector core pattern of the second cable connector.

3. The structured multicore fiber optic cabling system of claim 2, wherein:
the first port connector includes a first port alignment key having a second placement relative to the first connector core pattern of the first port connector,
the second port connector includes a second port alignment key having the second placement relative to the first connector core pattern of the second port connector,
the second placement relative to the first connector core pattern is opposite the first placement relative to the first connector core pattern,
each cable connector and each port connector includes a key-axis that lies in a plane which bisects the respective connector and is aligned with the cable alignment key or port alignment key of the respective connector,
in each cable connector interface and each port connector interface, the first and second end faces of the first plurality of multicore optical fibers are aligned in one or more arrays that are orthogonal to the key-axis of the respective connector, and
the core polarity is preserved between the first port connector of the first network component and the second port connector of the second network component when each of a first cable alignment key orientation and a second cable alignment key orientation is opposite that of a first port alignment key orientation or a second port alignment key orientation to which the respective first and second cable connector is operatively coupled.

4. The structured multicore fiber optic cabling system of claim 2, wherein:
the first port connector includes a first port alignment key having the first placement relative to the first connector core pattern of the first port connector,
the second port connector includes a second port alignment key having the first placement relative to the first connector core pattern of the second port connector,
each cable connector and each port connector includes a key-axis that lies in a plane which bisects the respective connector and is aligned with the cable alignment key or the port alignment key of the respective connector,
in each cable connector interface and each port connector interface, the first and second end faces of the first plurality of multicore optical fibers are aligned in one or more arrays that are parallel to the key-axis of the respective connector, and
the core polarity is preserved between the first port connector of the first network component and the second port connector of the second network component when each of a first cable alignment key orientation and a second cable alignment key orientation is the same as a first port alignment key orientation or a second port alignment key orientation to which the respective first and second cable connector is operatively coupled.

5. The structured multicore fiber optic cabling system of claim 4, wherein the first and second end faces of the first plurality of multicore optical fibers are aligned in one array that is parallel to the key-axis of the respective connector, and the first mirror-image symmetry of the first connector core pattern of each connector is about an axis of symmetry that is orthogonal to the key-axis.

6. The structured multicore fiber optic cabling system of claim 4, wherein the first and second end faces of the first plurality of multicore optical fibers are aligned in an even number of two or more arrays that are parallel to the key-axis of the respective connector, and the first mirror-image symmetry of the first connector core pattern of each connector is about an axis of symmetry that is parallel to the key-axis.

7. The structured multicore fiber optic cabling system of claim 1, wherein the first and second end faces of the first plurality of multicore optical fibers are arranged in at least two linear arrays, and each linear array of end faces includes 4, 8, 12, or 16 end faces.

8. The structured multicore fiber optic cabling system of claim 1, wherein the first port connector of each of the first and second network components is a trunk connector, and at least one of the first and second network components is one of a plurality of breakout modules, each breakout module of the plurality of breakout modules including:
the trunk connector having the first connector core pattern,
a second plurality of multicore optical fibers each including the first end face and the second end face, the second plurality of multicore optical fibers configured so that a first half thereof has the first draw direction and a second half thereof has the second draw direction, and
a plurality of branch connectors each including a branch connector interface and being operatively coupled to the trunk connector by a respective multicore optical fiber from each of the first and second halves of the second plurality of multicore optical fibers,
wherein each branch connector is configured so that the second end face of the multicore optical fiber having the first draw direction and the first end face of the multicore optical fiber having the second draw direction is placed in the branch connector interface to define a second connector core pattern having a second mirror-image symmetry.

9. The structured multicore fiber optic cabling system of claim 8, wherein the plurality of breakout modules includes a third breakout module and a fourth breakout module, the one or more multicore fiber optic cable assemblies includes a second multicore fiber optic cable assembly, and the structured multicore fiber optic cabling system further comprises:
a plurality of multicore duplex patch cords, each multicore duplex patch cord including:
a first multicore optical fiber including the first end face having the first end face core pattern and the second end face having the second end face core pattern,
a second multicore optical fiber including the first end face having the first end face core pattern and the second end face having the second end face core pattern,
a first patch cord connector defining a first end of the multicore duplex patch cord and including a first patch cord connector interface, wherein the first end face of the first multicore optical fiber and the second end face of the second multicore optical fiber are placed in the first patch cord connector interface to define the second connector core pattern, and
a second patch cord connector defining a second end of the multicore duplex patch cord and including a second patch cord connector interface, wherein the second end face of the first multicore optical fiber and the first end face of the second multicore optical fiber are placed in the first patch cord connector interface to define the second connector core pattern,
wherein the trunk connector of the third network component is operatively coupled to the trunk connector of the fourth network component by the second multicore fiber optic cable assembly, and
each of the branch connectors of the second network component is operatively coupled to a respective branch connector of the third network component to define a cross-connection between the first network component and the fourth network component.

10. The structured multicore fiber optic cabling system of claim 8, further comprising:
a third network component including one or more transceivers each having a high-density transceiver interface; and
one or more multicore duplex patch cords, each multicore duplex patch cord including:
a first multicore optical fiber including the first end face having the first end face core pattern and the second end face having the second end face core pattern,
a second multicore optical fiber including the first end face having the first end face core pattern and the second end face having the second end face core pattern,
a first patch cord connector defining a first end of the multicore duplex patch cord, the first patch cord connector including a patch cord alignment key defining a key-axis and a first patch cord connector interface having a cross-axis orthogonal to the key-axis,
a second patch cord connector defining a second end of the multicore duplex patch cord, the second patch cord connector including the patch cord alignment key defining the key-axis and a second patch cord connector interface having the cross-axis orthogonal to the key-axis, wherein
each of the first and second end face core patterns includes a plurality of cores arranged in a linear array of cores,
the first end face of the first multicore optical fiber and the second end face of the second multicore optical fiber are placed in the first patch cord connector interface so that each linear array of cores is aligned with the cross-axis of the first patch cord connector and to define the second connector core pattern having the second mirror-image symmetry, and
the second end face of the first multicore optical fiber and the first end face of the second multicore optical fiber are placed in the second patch cord connector interface so that each linear array of cores is aligned with the cross-axis of the second patch cord connector and to define the second connector core pattern having the second mirror-image symmetry,
wherein the second network component is one of the plurality of breakout modules, each branch connector of the second network component includes a branch alignment key defining the key-axis of the branch connector, and the branch connector interface has the cross-axis orthogonal to the key-axis and the second connector core pattern,
the high-density transceiver interface includes a transceiver connector having a transceiver alignment key defining the key-axis of the transceiver connector, and a transceiver connector interface having the cross-axis orthogonal to the key-axis and the second connector core pattern, and
each transceiver connector is operatively coupled to a respective branch connector by a respective multicore duplex patch cord of the one or more multicore duplex patch cords with a same key orientation.

11. The structured multicore fiber optic cabling system of claim 1, wherein:
the first cable connector includes a first cable alignment key having a first placement relative to the first connector core pattern of the first cable connector, and
the second cable connector includes a second cable alignment key having a second placement relative to the first connector core pattern of the second cable connector that is opposite the first placement relative to the first connector core pattern.

12. The structured multicore fiber optic cabling system of claim 11, wherein:
the first port connector includes a first port alignment key having the second placement relative to the first connector core pattern of the first port connector,
the second port connector includes a second port alignment key having the first placement relative to the first connector core pattern of the second port connector, and
the core polarity is preserved between the first port connector of the first network component and the second port connector of the second network component when each of first and second cable alignment key orientations is the opposite of the first or second port alignment key orientation to which the respective first and second cable connector is operatively coupled.

13. A breakout module for a structured multicore fiber optic cabling system, comprising:
a plurality of multicore optical fibers each including a first end face having a first end face core pattern and a second end face having a second end face core pattern that is a mirror-image of the first end face core pattern, the plurality of multicore optical fibers being configured so that a first half thereof has a first draw direction and a second half thereof has a second draw direction opposite the first draw direction,
a trunk connector including a trunk connector interface configured so that the first end face of each multicore optical fiber having the first draw direction and the second end face of each multicore optical fiber having the second draw direction is placed in the trunk connector interface to define a first connector core pattern having a first mirror-image symmetry; and
a plurality of branch connectors each including a branch connector interface and being operatively coupled to the trunk connector by a respective multicore optical fiber from each of the first and second halves of the plurality of multicore optical fibers,
wherein each branch connector is configured so that the second end face of the multicore optical fiber having the first draw direction and the first end face of the multicore optical fiber having the second draw direction is placed in the branch connector interface to define a second connector core pattern having a second mirror-image symmetry.

14. The breakout module of claim 13, wherein:
the first mirror-image symmetry is about an axis of symmetry of the trunk connector interface,
the first and second end faces of the plurality of multicore optical fibers are arranged in a linear array orthogonal to the axis of symmetry in the trunk connector interface such that each first end face is on one side of the axis of symmetry, and each second end face is on the other side of the axis of symmetry, and each of the branch connectors is operatively coupled to a respective pair of multicore optical fibers associated with first and second end faces on each side of, and the same distance from, the axis of symmetry.

15. The breakout module of claim 13, wherein:

the first mirror-image symmetry is about an axis of symmetry of the trunk connector interface, the end faces of the trunk connector are arranged in a linear array orthogonal to the axis of symmetry such that the first end faces alternate with the second end faces, and each of the branch connectors is operatively coupled to a pair of multicore optical fibers having adjacent end faces at the trunk connector interface of the trunk connector.

16. A method of making a structured multicore fiber optic cabling system, comprising:

providing a first cable connector including a first cable connector interface;

providing second cable connector including a second cable connector interface;

providing a first plurality of multicore optical fibers each including a first end face having a first end face core pattern and a second end face having a second end face core pattern that is a mirror-image of the first end face core pattern;

arranging the first plurality of multicore optical fibers so that a first half thereof has a first draw direction, and a second half thereof has a second draw direction opposite the first draw direction;

placing the first end face of each multicore optical fiber having the first draw direction and the second end face of each multicore optical fiber having the second draw direction in the first cable connector interface to define a first connector core pattern having a first mirror-image symmetry;

placing the first end face of each multicore optical fiber having the second draw direction and the second end face of each multicore optical fiber having the first draw direction in the second cable connector interface to define the first connector core pattern;

providing a plurality of network components each including a port connector having a port connector interface including a plurality of end faces with a first half thereof having the first end face core pattern and second half thereof having the second end face core pattern;

placing each end face of the plurality of end faces in the port connector interface to define the first connector core pattern;

operatively coupling one of the first cable connector or the second cable connector to a first port connector of a first network component of the plurality of network components; and operatively coupling the other of the first cable connector or the second cable connector to a second port connector of a second network component of the plurality of network components, wherein core polarity is preserved between the first network component and the second network component regardless of whether the first cable connector or the second cable connector is operatively coupled to the first port connector.

17. The method of claim 16, further comprising:

placing a first cable alignment key on the first cable connector at a first placement relative to the first connector core pattern of the first cable connector;

placing a second cable alignment key on the second cable connector at the first placement relative to the first connector core pattern of the second cable connector;

placing a first port alignment key on the first port connector at a second placement relative to the first connector core pattern of the first port connector;

placing a second port alignment key on the second port connector at the second placement relative to the first connector core pattern of the second port connector; and aligning, in each cable connector interface and each port connector interface, the first and second end faces of the first plurality of multicore optical fibers in one or more arrays that are orthogonal to a key-axis of the respective connector, wherein the second placement relative to the first connector core pattern is opposite the first placement relative to the first connector core pattern, the key-axis of each connector lies in a plane that bisects the respective connector and is aligned with the cable alignment key or the port alignment key of the respective connector, and the core polarity is preserved between the first and second network components when the first and second port connectors are operatively coupled to each other through the first and second cable connectors and each of the first and second cable alignment key orientations are opposite the respective first or second port alignment key to which they are operatively coupled.

18. The method of claim 16, further comprising:

placing a first cable alignment key on the first cable connector at a first placement relative to the first connector core pattern of the first cable connector;

placing a second cable alignment key on the second cable connector at the first placement relative to the first connector core pattern of the second cable connector;

placing a first port alignment key on the first port connector at a second placement relative to the first connector core pattern of the first port connector;

placing a second port alignment key on the second port connector at the second placement relative to the first connector core pattern of the second port connector; and aligning, in each cable connector interface and each port connector interface, the first and second end faces of the first plurality of multicore optical fibers in one or more arrays that are parallel to a key-axis of the respective connector, wherein the key-axis of each cable connector and each port connector lies in a plane which bisects the respective connector and is aligned with the cable alignment key or the port alignment key of the respective connector, and the core polarity is preserved between the first and second network components when the first and second port connectors are operatively coupled to each other through the first and second cable connectors and each of the first and second cable alignment key orientations are opposite the respective first or second port alignment key to which they are operatively coupled.

19. The method of claim 16, wherein the first port connector of each of the first and second network components is a trunk connector having the first connector core pattern, at least one of the first and second network components is one of a plurality of breakout modules, and further comprising:

providing each breakout module with a second plurality of multicore optical fibers each including the first end face and the second end face;

configuring the second plurality of multicore optical fibers so that a first half thereof has the first draw direction and a second half thereof has the second draw direction;

providing each breakout module with a plurality of branch connectors each including a branch connector interface;

operatively coupling each branch connector to the trunk connector by a respective multicore optical fiber from each of the first and second halves of the second plurality of multicore optical fibers; and placing the second end face of the multicore optical fiber having the first draw direction and the first end face of the multicore optical fiber having the second draw direction in the branch connector to define a second connector core pattern having a second mirror-image symmetry in the branch connector interface.

20. The method of claim 16, further comprising:

placing a first cable alignment key on the first cable connector in a first placement relative to the first connector core pattern of the first cable connector, and placing a second cable alignment key on the second cable connector in a second placement relative to the first connector core pattern of the second cable connector that is opposite the first placement relative to the first connector core pattern.

* * * * *